(12) United States Patent
Huang et al.

(10) Patent No.: US 8,798,399 B2
(45) Date of Patent: Aug. 5, 2014

(54) DATA DECOMPOSITION METHOD AND COMPUTER SYSTEM THEREFROM

(75) Inventors: Norden E. Huang, Jhongli (TW); Zhao-Hua Wu, Jhongli (TW); Xian-Yao Chen, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 1060 days.

(21) Appl. No.: 12/411,539

(22) Filed: Mar. 26, 2009

(65) Prior Publication Data

US 2010/0092028 A1    Apr. 15, 2010

Related U.S. Application Data

(60) Provisional application No. 61/195,894, filed on Oct. 10, 2008.

(51) Int. Cl.
*G06K 9/54* (2006.01)

(52) U.S. Cl.
USPC ............. 382/302; 382/113; 702/3; 702/179; 702/189; 702/190

(58) Field of Classification Search
USPC ............. 382/113, 302; 702/3, 179, 189, 190
See application file for complete search history.

(56) References Cited

U.S. PATENT DOCUMENTS

| | | | |
|---|---|---|---|
| 5,983,162 A | 11/1999 | Huang | |
| 6,311,130 B1 | 10/2001 | Huang | |
| 6,381,559 B1 | 4/2002 | Huang | |
| 6,738,734 B1 | 5/2004 | Huang | |
| 7,941,298 B2 * | 5/2011 | Huang et al. | .......... 702/194 |
| 2008/0065337 A1 | 3/2008 | Huang et al. | |

OTHER PUBLICATIONS

Wu et al., "Ensemble Empirical Mode Decomposition: A Noise Assisted Data Analysis Method", 2005, iges.org, Technical Report.*
Wu et al., "On the trend, detrending, and variability of nonlinear and nonstationary time series", Sep. 2007, Proc. of the National Academy of Sciences, vol. 104, issue 38, 14889-14894.*
Huang "An Adaptive Data Analysis Method for Nonlinear and Nonstationary Time Series: The Empirical Mode Decomposition and Hilbert Spectral Analysis", 2006, Wavelet Analysis and Applications, Springer, 363-376.*
Norden E. Huang et al. "A confidence limit for the empirical mode decomposition and Hilbert spectral analysis" Proc. R. Soc. Lond. A (2003) 459, 2317-2345.

* cited by examiner

*Primary Examiner* — Jason M Repko
*Assistant Examiner* — Katrina Fujita
(74) *Attorney, Agent, or Firm* — McClure, Qualey & Rodack, LLP

(57) ABSTRACT

For multi-dimensional temporal-spatial data, EEMD is applied to time series of each spatial location to obtain IMF-like components of different time scales. All the ith IMF-like components of all the time series of all spatial locations are arranged to obtain ith temporal-spatial multi-dimensional IMF-like component. For two-dimensional spatial data or images, the two-dimensional spatial data or images are consider as a collection of one-dimensional series in first direction along locations in second direction. The same approach to the one used in temporal-spatial data decomposition is used to obtain the resulting two-dimensional IMF-like components. Each of the resulted IMF-like components are taken as the new two-dimensional data for further decomposition, but the data is considered as a collection of one-dimensional series in second-direction along locations in first-direction.

20 Claims, 20 Drawing Sheets
(18 of 20 Drawing Sheet(s) Filed in Color)

DATA DECOMPOSITION METHOD AND COMPUTER SYSTEM THEREFROM

RELATED APPLICATIONS

This application claims priority to American Provisional Application Ser. No. 61/195,894, filed Oct. 10, 2008, which is herein incorporated by reference.

BACKGROUND

1. Field of Invention

The present invention relates to physical data decomposition. More particularly, the present invention relates to decomposing and analyzing spatial physical data.

2. Description of Related Art

The combination of Empirical Mode Decomposition (EMD) with the Hilbert Spectral Analysis (HSA) designated as the Hilbert-Huang Transform (HHT), in Patents number 1 to 5 by the National Aeronautics and Space Administration (NASA), has provided an alternative paradigm in time-frequency analysis. The Hilbert Transform is well known and has been widely used in the signal processing field since the 1940s (Gabor 1946). However, the Hilbert Transform has many drawbacks (Bedrosian 1963, Nuttall 1966) when applied to instantaneous frequency computation. The most serious drawback is that the derived instantaneous frequency of a signal could lose its physical meaning when the signal is not a mono-component or AM/FM separable oscillatory function (Huang et al. 1998). The EMD, at its very beginning (Huang, et al. 1996, 1998, and 1999), was developed to overcome this drawback so that the data can be examined in a physically meaningful time-frequency-amplitude space. It has been widely accepted that the EMD, with its new improvements (Huang et al. 2003, Wu and Huang 2004, Wu and Huang 2005a, 2005b, Wu et al. 2007, Wu and Huang 2008a, Huang et al. 2008), has become a powerful tool in both signal processing and scientific data analysis (Huang and Attoh-Okine 2005 and Huang and Shen 2005, Huang and Wu 2008b).

Contrary to almost all the previous decomposition methods, EMD is empirical, intuitive, direct, and adaptive, without pre-determined basis functions. The decomposition is designed to seek the different simple intrinsic modes of oscillations in any data based on local time scales. A simple oscillatory mode is called intrinsic mode function (IMF) which satisfies: (a) in the whole data set, the number of extrema (maxima value or minima value) and the number of zero-crossings must either equal or differ at most by one; and (b) at any point, the mean value of the envelope defined by the local maxima and the envelope defined by the local minima is zero.

The EMD is implemented through a sifting process that uses only local extrema. From any data $r_{j-1}$, say, the procedure is as follows: 1) identify all the local extrema and connect all local maxima (minima) with a cubic spline as the upper (lower) envelope; 2) obtain the first component h by taking the difference between the data and the local mean of the two envelopes; and 3) treat h as the data and repeat steps 1 and 2 until the envelopes are symmetric with respect to zero mean under certain criterion. The final h is designated as $c_j$. A complete sifting process stops when the residue, $r_n$, becomes a monotonic function or a function with only one extrema from which no more IMF can be extracted. In short, the EMD is an adaptive method that decompose data $x(t)$ in terms of IMFs $c_j$ and a residual component $r_n$, i.e., $$x(t) = \sum_{j=1}^{n} c_j + r_n \tag{1}$$

In Eq. (1), the residual component $r_n$ could be a constant, a monotonic function, or a function that contains only a single extrema, from which no more IMF can be extracted. In this way, the decomposition method is adaptive, and, therefore, highly efficient. As the decomposition is based on the local characteristics of the data, it is applicable to nonlinear and nonstationary processes.

Although EMD is a simple decomposition method, it has many wonderful characteristics that other decomposition methods lack. Flandrin et al. (2004 and 2005), Flandrin and Gonçalves (2004) studied the Fourier spectra of IMFs of fractional Gaussian noise, which are widely used in the signal processing community and financial data simulation. They found that the spectra of all IMFs except the first one of any fractional Gaussian noise collapse to a single shape along the axis of the logarithm of frequency (or period) with appropriate amplitude scaling of the spectra. The center frequencies (periods) of the spectra of the neighboring IMFs are approximately halved (and hence doubled); therefore, the EMD is essentially a dyadic filter bank. Flandrin et al. (2005) also demonstrated that EMD behaves like a cubic spline wavelet when it is applied to Delta functions. Independently, Wu and Huang (2004, 2005a) found the same result for white noise (which is a special case of fractional Gaussian noise). In addition to that, Wu and Huang (2004, 2005a) argued using the central limit theorem that each IMF of Gaussian noise is approximately Gaussian distributed, and therefore, the energy of each IMF must be a X2 distribution. From the characteristics they obtained, Wu and Huang (2004, 2005) further derived the expected energy distribution of IMFs of white noise. By determining the number of degrees of freedom of the X2 distribution for each IMF of noise, they derived the analytic form of the spread function of the energy of IMF. From these results, one would be able to discriminate an IMF of data containing signals from that of only white noise with any arbitrary statistical significance level. They verified their analytic results with those from the Monte Carlo test and found consistency.

The powerfulness of EMD has stimulated the development of two-dimensional EMD (or bi-dimensional EMD, BEMD, as will be referred later). By far, many researchers have explored the possibility of extending EMD for multi-dimensional spatial-temporal data analysis and for spatially two-dimensional image analysis. One method is to treat a two-dimensional image as a collection of one-dimensional slices and then decompose each slice using one-dimensional EMD. This is a pseudo-two-dimensional EMD. The first attempt of such type was initiated by Huang (2001, in Patent number 2). This method was later used by Long (2005) on wave data and produced excellent patterns and statistics of surface ripple riding on underlying long waves. In general, such an approach seems to work well in some cases of dealing with temporal-spatial data when a dominant direction could be identified clearly. However, in most of cases of pseudo-BEMD, the spatial structure is essentially determined by textual scales. If spatial structures of different textual scales are easily distinguishable, with clear directionality and without intermittency, this approach would be appropriate. If it is not, the applicability of this approach is significantly reduced. The main shortcoming of this approach is the inter-slice discontinuity due to EMD being sensitive to small data perturbation, intermittency and highly variable directionality.

The second type of effort is to directly transplant the idea and algorithm behind the EMD for image decomposition. As it has been introduced early, while EMD is a one-dimensional data decomposition method, its essential step of fitting extrema of one-dimensional data with upper and lower curves (envelopes) using a cubic spline or low order polynomials is applicable straightforwardly to two dimensional images, with fitting surfaces replacing fitting curves. Currently, there are several versions of genuine two-dimensional EMD, each containing a fitting surface determined by its own method. Nunes et al. (2003a, b, and 2005) used a radial basis function for surface interpretation, and the Riesz transform rather than the Hilbert transform for computing the local wave number. Linderhed (2005) used the thin-plate spline for surface interpretation to develop two-dimensional EMD data for an image compression scheme, which has been demonstrated to retain a much higher degree of fidelity than any of the data compression schemes using various wavelet bases. Song and Zhang (2001), Damerval et al. (2005) and Yuan et al. (2008) used a third way based on Delaunay Triangulation and on piecewise cubic polynomial interpretation to obtain an upper surface and a lower surface. Xu et al. (2006) provided the fourth approach by using a mesh fitting method based on finite elements. These BEMDs have accomplished some successes when they are applied to various fields of engineering and sciences.

Unfortunately, currently available genuine BEMDs, as those mentioned earlier, have several difficulties. The first one is the definition of extrema. All two-dimensional data have saddle, ridge and trough structures, one needs to make a decision of whether the saddle and ridge (trough) points should be considered maxima (minima). The fitting surfaces could be greatly different in the case of considering ridge (trough) points as maxima and in the case of not. Consequently, the decomposition results would be dramatically different. The second difficulty is that surface fitting can be computationally expensive. In many cases, it involves a very large matrix and its eigenvalue computations, and the fittings offer only an approximation and could not go through all the actual extrema. The third difficulty, and probably the most serious one, is the mode mixing, or more generally, scale mixing. In one-dimensional EMD, scale mixing is defined as a single IMF either consisting of signals of widely disparate scales, or a signal of a similar scale residing in different IMF components, caused by unevenly distributed extrema along the time axis (Huang et al. 1999, Wu and Huang 2005b, 2008). This difficulties of scale mixing can cause the similar problems in BEMD. For example, the decomposition of two-dimensional sinusoidal waves with part (suppose the lower-left quarter) of the data contaminated by noise could lead to the decomposed components of which none has the structure of the two-dimensional sinusoidal waves. Since two-dimensional data can contain noise, such decomposition using BEMD is unstable and can be very sensitive to noise, essentially leading to the physically un-interpretable results, similar to the one-dimensional case described by Huang et al. (1999) and Wu and Huang (2005b, 2008).

SUMMARY

According to one embodiment of the present invention, a computer implemented method for extracting intrinsic mode functions of physical data is disclosed, in which the method includes the step of receiving the physical data representative of physical phenomenon; adding a first kind of white noise series to the physical data; decomposing the physical data with the added first kind of white noise series into intrinsic mode functions; and obtaining a mean value of the intrinsic mode functions.

According to another embodiment of the present invention, a computer implemented method for processing and applying two-dimensional physical data is disclosed. The method includes receiving the two-dimensional physical data representative of the physical phenomenon; decomposing the two-dimensional physical data in first direction to extract first intrinsic mode function components; combining the first intrinsic mode function components; decomposing the combined first intrinsic mode function components in second direction to extract second intrinsic mode function components; and combining the second intrinsic mode function components.

According to still another embodiment of the present invention, a computer implemented method for processing and applying multi-dimensional temporal-spatial data is disclosed. The method includes receiving a time series of each spatial location of the multi-dimensional temporal-spatial data; decomposing the time series to extract intrinsic mode functions components; and combining the intrinsic mode function components of different spatial location to get multi-dimensional temporal-spatial intrinsic mode functions.

According to other embodiment of the present invention, a computer system for processing and applying physical data, the system includes a memory storing computer executable instructions for receiving the physical data representative of physical phenomenon; decomposing the physical data in first direction to extract first intrinsic mode function components; combining the first intrinsic mode function components; decomposing the combined first intrinsic mode function components in second direction to extract second intrinsic mode function components; combining the second intrinsic mode function components; and displaying images composed of the combined second intrinsic mode function components.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings, where the patent or application file contains at least one drawing executed in color. Copies of this patent or patent application publication with color drawing(s) will be provided by the office upon request and payment of necessary fee.

DESCRIPTION OF THE PREFERRED EMBODIMENTS

Figure 1:
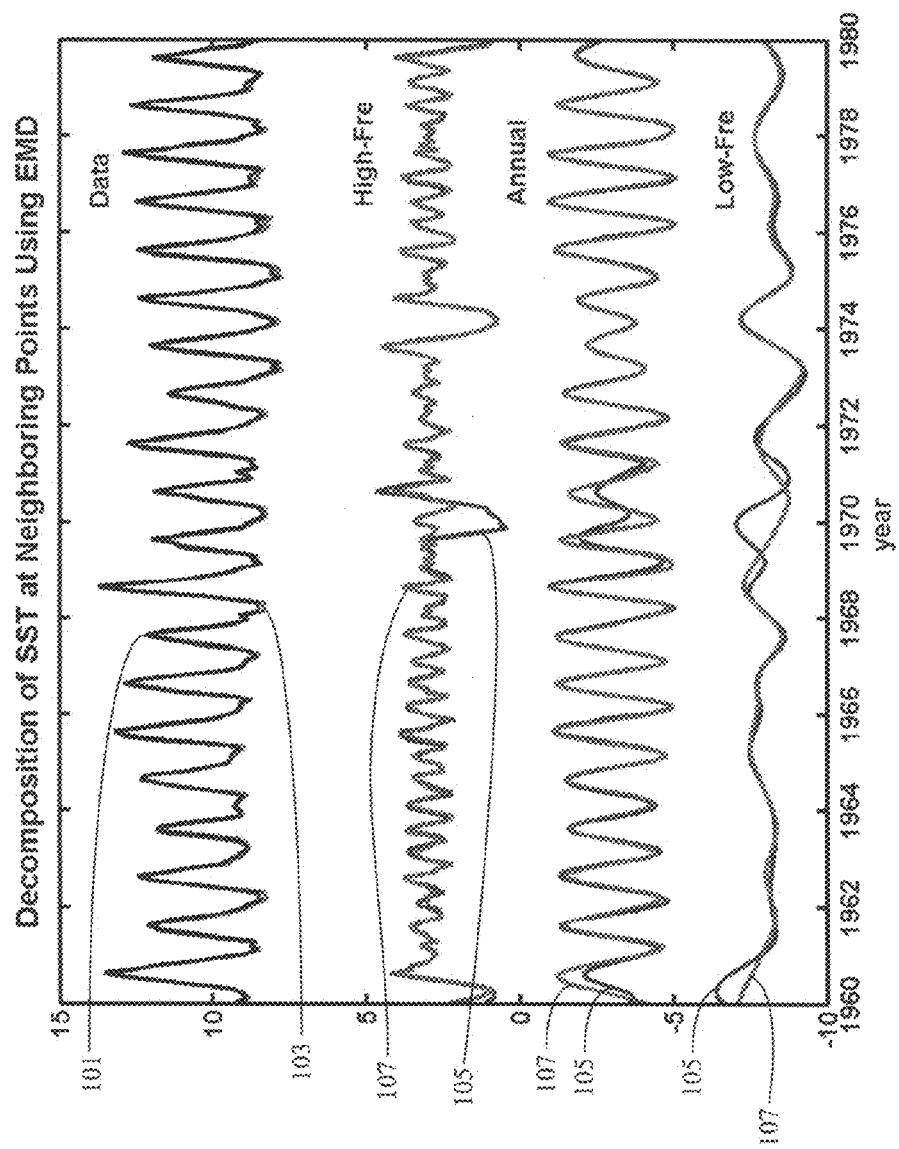
FIG. 1 shows the mode (scale) mixing and the sensitivity of decomposition of the Empirical Mode Decomposition to small perturbation.

Reference will now be made in detail to the present preferred embodiments of the invention, examples of which are illustrated in the accompanying drawings. Wherever possible, the same reference numbers are used in the drawings and the description to refer to the same or like parts.

An apparatus, computer program product, and methods of decomposing and analyzing multi-dimensional temporal-spatial data and multi-dimensional spatial data (such as images or solid with variable density) are proposed here. For multi-dimensional temporal-spatial data, EEMD is applied to time series of each spatial location to obtain IMF-like components of different time scales. All the ith IMF-like components of all the time series of all spatial locations are arranged to obtain ith temporal-spatial multi-dimensional IMF-like component.

For two-dimensional spatial data or images, f(x,y), we consider the data (or image) as a collection of one-dimensional series in x-direction along locations in y-direction. The same approach to the one used in temporal-spatial data decomposition is used to obtain the resulting two-dimensional IMF-like components. Each of the resulted IMF-like components are taken as the new two-dimensional data for further decomposition, but the data is considered as a collection of one-dimensional series in y-direction along locations in x-direction. In this way, we obtain a collection of two-dimensional components. These directly resulted components are further combined into a reduced set of final components based on a minimal-scale combination strategy.

The approach for two-dimensional spatial data can be extended to multi-dimensional data. EEMD is applied in the first dimension, then in the second direction, and then in the third direction, etc., using the almost identical procedure as for the two-dimensional spatial data. A similar minimal-scale combination strategy can be applied to combine all the directly resulted components into a small set of multi-dimensional final components.

In the following embodiment, we introduce a new multi-dimensional EMD method based on the Ensemble EMD (EEMD), a noise assisted data analysis method that overcome many drawbacks of EMD such as the sensitivity of decomposition to small perturbation of data. It will be demonstrated that, with good properties of EEMD, the inter-slice discontinuity in pseudo-BEMD is no longer a daunting problem. By applying EEMD to spatial data in one dimension (pseudo-BEMD) and then followed by applying EEMD in the second dimension to the results of the decompositions of the first dimension, and then combining appropriate components, we obtain the decompositions of image. It will be shown that this EEMD-based approach can be extended to spatial data of any number of dimensions.

As mentioned earlier, one of the major drawbacks of EMD is mode mixing, which is defined as a single IMF either consisting of signals of widely disparate scales, or a signal of a similar scale residing in different IMF components. Mode mixing is a consequence of signal intermittency. The intermittency could not only cause serious aliasing in the time-frequency distribution, but also make the individual IMF lose its clear physical meaning. Another side-effect of mode mixing is the lack of physical uniqueness. An illustrative example is decomposition of two time series corresponding to the observations of sea surface temperature (SST) which differ slightly at any time. Due to scale mixing, the decompositions could be significantly different, which is shown in FIG. 1.

FIG. 1 shows the mode (scale) mixing and the sensitivity of decomposition of the Empirical Mode Decomposition to small perturbation. The data of two SST observations (see Rayner et al. 1996) of spatial locations (20° W, 60° N) and (19° W, 60° N) are plotted as the black lines 101 and green lines 103, respectively. Their corresponding components are plotted as the blue lines 105 and red lines 107, respectively. The numbers in the vertical scales provides the scales of variability of both observations and their components.

Clearly, in this example, all corresponding components around 1960 and 1970 are significantly different. The significant differences in decompositions but only minor differences in the original inputs raises a question: Which decomposition is reliable?

The answer to this question can never be definite. However, since the cause of the problem is due to mode (scale) mixing, one expects that the decomposition would be reliable if the mode mixing problem is alleviated or eliminated. To achieve the latter goal, Huang et al. (1999) proposed an intermittency test. However, the approach itself has its own problems: First, the test is based on a subjectively selected scale, which makes EMD no longer totally adaptive. Second, the subjective selection of scales may not work if the scales are not clearly separable. To overcome the scale mixing problem, a new noise-assisted data analysis method was proposed, the Ensemble EMD (EEMD), which defines the true IMF components as the mean of an ensemble of trials, each consisting of the signal plus a white noise of finite amplitude.

The Ensemble EMD algorithm contains the following steps:

Step a add a white noise series to the targeted data;

Step b decompose the data with added white noise into IMFs;

Step c repeat step a and step b again and again, but with different white noise series each time; and Step d obtain the (ensemble) means of corresponding IMFs of the decompositions as the final result.

The principle of EEMD is simple: the added white noise would populate the whole time-frequency space uniformly with the constituent components at different scales. When the signal is added to this uniform background, the bits of signals of different scales are automatically projected onto proper scales of reference established by the white noise. Although each individual trial may produce very noisy results, the noise in each trial is canceled out in the ensemble mean of enough trails; the ensemble mean is treated as the true answer.

The critical concepts advanced in EEMD are based on the following observations:

A collection of white noise cancels each other out in a time space ensemble mean; therefore, only the signal can survive and persist in the final noise-added signal ensemble mean.

Finite, not infinitesimal, amplitude white noise is necessary to force the ensemble to exhaust all possible solutions; the finite magnitude noise makes the different scale signals reside in the corresponding IMFs, dictated by the dyadic filter banks, and render the resulting ensemble mean more meaningful.

The physically meaningful answer of the EMD is not the one without noise; it is designated to be the ensemble mean of a large number of trials consisting of the noise-added signal.

As an analogue to a physical experiment that could be repeated many times, the added white noise is treated as the possible random noise that would be encountered in the measurement process. Under such conditions, the ith 'artificial' observation will be $$x_i(t) = x(t) + w_i(t), \quad (2)$$

where wi(t) is the ith realization of the white noise series. In this way, multiple artificial observations are mimicked.

As the ensemble number approaches infinity, the truth, $c_j(t)$, as defined by EEMD, is $$c_j(t) = \lim_{N \to \infty} \frac{1}{N} \sum_{k=1}^{N} [c_j(t) + r_k(t)], \quad (3)$$

in which $c_j(t) + r_k(t)$ (4)

is the kth trial of the jth IMF in the noise-added signal. The amplitude of noise wi(t) is not necessarily small. But the ensemble number of the trials, N, has to be large. The difference between the truth and the result of the ensemble is governed by the well-known statistical rule: it decreases as one over the square-root of N.

Figure 2:
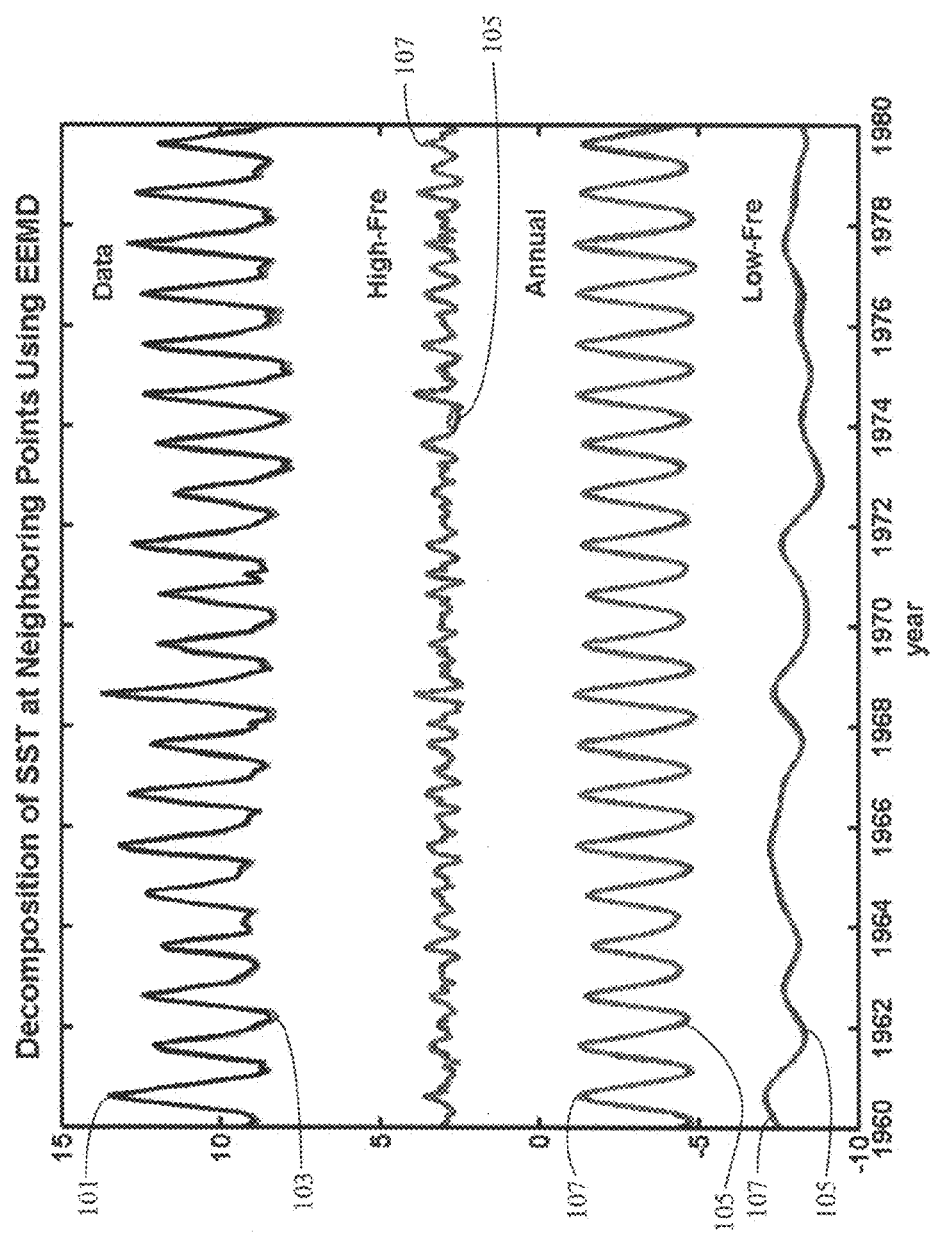
FIG. 2 shows the mode (scale) mixing and the sensitivity of decomposition of the Ensemble Empirical Mode Decomposition to small perturbation.

FIG. 2 shows the mode (scale) mixing and the sensitivity of decomposition of the Ensemble Empirical Mode Decomposition to small perturbation. With EEMD, the mode mixing is largely eliminated and the consistency of the decompositions of slightly different pairs of data, such as RSS T2 and UAH T2, is greatly improved, as illustrated in FIG. 2 (the black line 101 is almost the same as the green line 103, and the red line 107 is almost the same as the blue line 105). Indeed, EEMD represents a major improvement over the original EMD. As the level of added noise is not of critical importance, as long as it is of finite amplitude while allowing for a fair and large number of ensemble of all the possibilities. EEMD can be used without any significant subjective intervention; thus, it provides a truly adaptive data analysis method. By eliminating the problem of mode mixing, a set of IMFs are produced that may bear the full physical meaning for each IMF component, and a time-frequency distribution without transitional gaps. The EMD, with the ensemble approach, has become a more mature tool for nonlinear and non-stationary time series (and other one dimensional data) analysis.

The EEMD resolves, to a large degree, the problem of mode mixing. It might have resolved the physical uniqueness problem too, for the finite magnitude perturbations introduced by the added noises have produced the mean in the neighborhood of all possibilities.

The pseudo-BEMD is as the following: Suppose that we have a temporal-spatial field $f(\vec{s}, t)$ with M spatial locations and each having N temporal records $$f(m, n) = \begin{pmatrix} f_{1,1} & f_{2,1} & \cdots & f_{M,1} \\ f_{1,2} & f_{2,2} & \cdots & f_{M,2} \\ \cdots & \cdots & \cdots & \cdots \\ f_{1,N} & f_{2,N} & \cdots & f_{M,N} \end{pmatrix}, \quad (5)$$

in which each column is a time series of the evolution of a quantity at a spatial location. We write mth column of the gridded data as $$f(m, \sim) = \begin{pmatrix} f_{m,1} \\ f_{m,2} \\ \cdots \\ f_{m,N} \end{pmatrix}. \quad (6)$$

Its decompositions using EMD is $$f(m, \sim) = \sum_{j=1}^{J} C_j(m, \sim) = \sum_{j=1}^{J} \begin{pmatrix} c_{m,1,j} \\ c_{m,2,j} \\ \cdots \\ c_{m,N,j} \end{pmatrix} \quad (7)$$

After all columns of the original data are decomposed, we rearrange the outputs into J number of matrices, with jth matrix being $$g_j(m, n) = \begin{pmatrix} c_{1,1,j} & c_{2,1,j} & \cdots & c_{M,1,j} \\ c_{1,2,j} & c_{2,2,j} & \cdots & c_{M,2,j} \\ \cdots & \cdots & \cdots & \cdots \\ c_{1,N,j} & c_{2,N,j} & \cdots & c_{M,N,j} \end{pmatrix} \quad (8)$$

In this way, we obtain J components of the original data f(m,n). Due to the scale mixing problem of EMD as described previously, the inter-slice discontinuity is very severe, as shown in FIG. 3.

Figure 3:
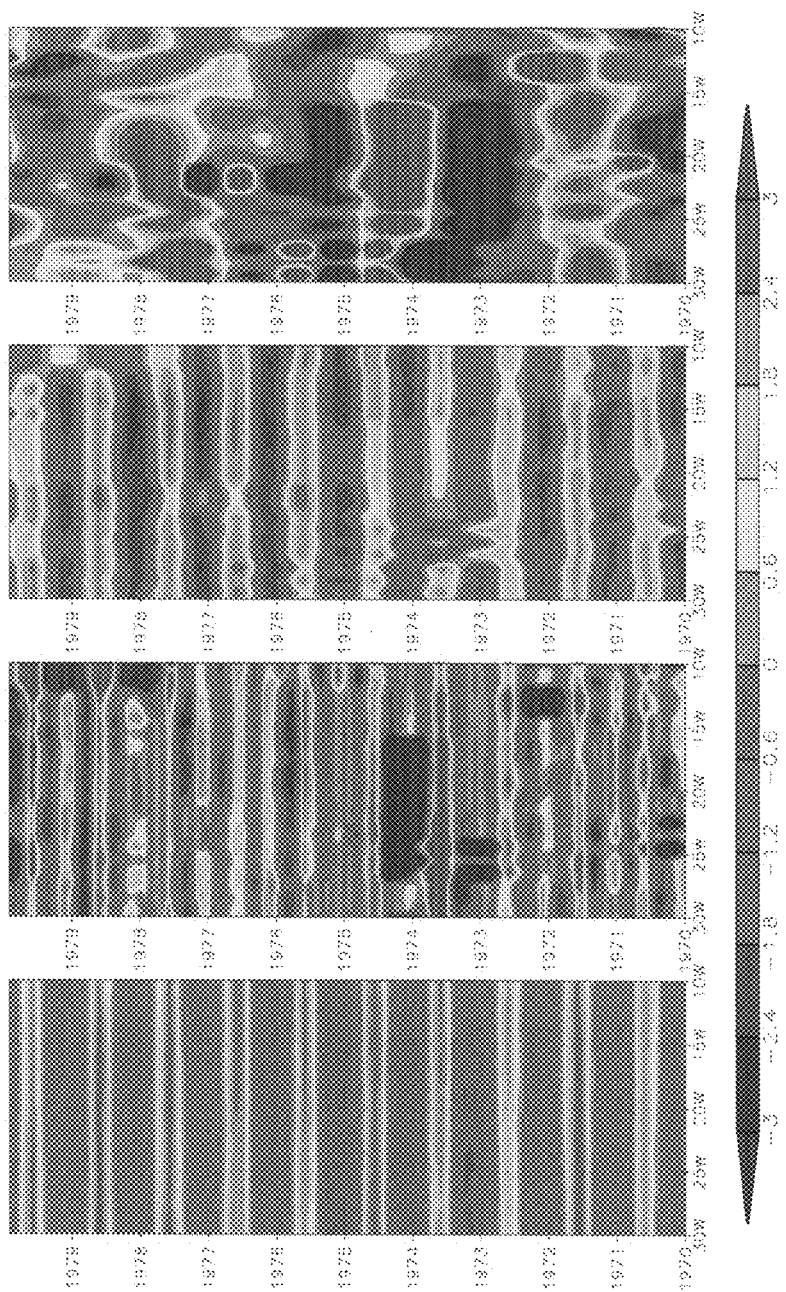
FIG. 3 shows the decomposition of the sea surface temperature (SST) from 30° W to 10° W along 60° N latitude using EMD-based pseudo-BEMD.

FIG. 3 shows the decomposition of the sea surface temperature (SST) from 30° W to 10° W along 60° N latitude using EMD-based pseudo-BEMD. Panels from the left to the right are the SST, its high frequency component, its MAC (ANNUAL CYCLE), and its low frequency component. The color bar provides the shaded interval for the left panel. For the panels 2 to 4 from the left, the shaded interval should the color bar multiplied by a factor of ⅓, ⅚, and ⅙, respectively, in which the decomposition of the observed SST from 30° W to 10° W along 60° N is plotted. Clearly, there are unorganized scatted large values in all the components in FIG. 3 which are harder to be interpreted physically.

Figure 4:
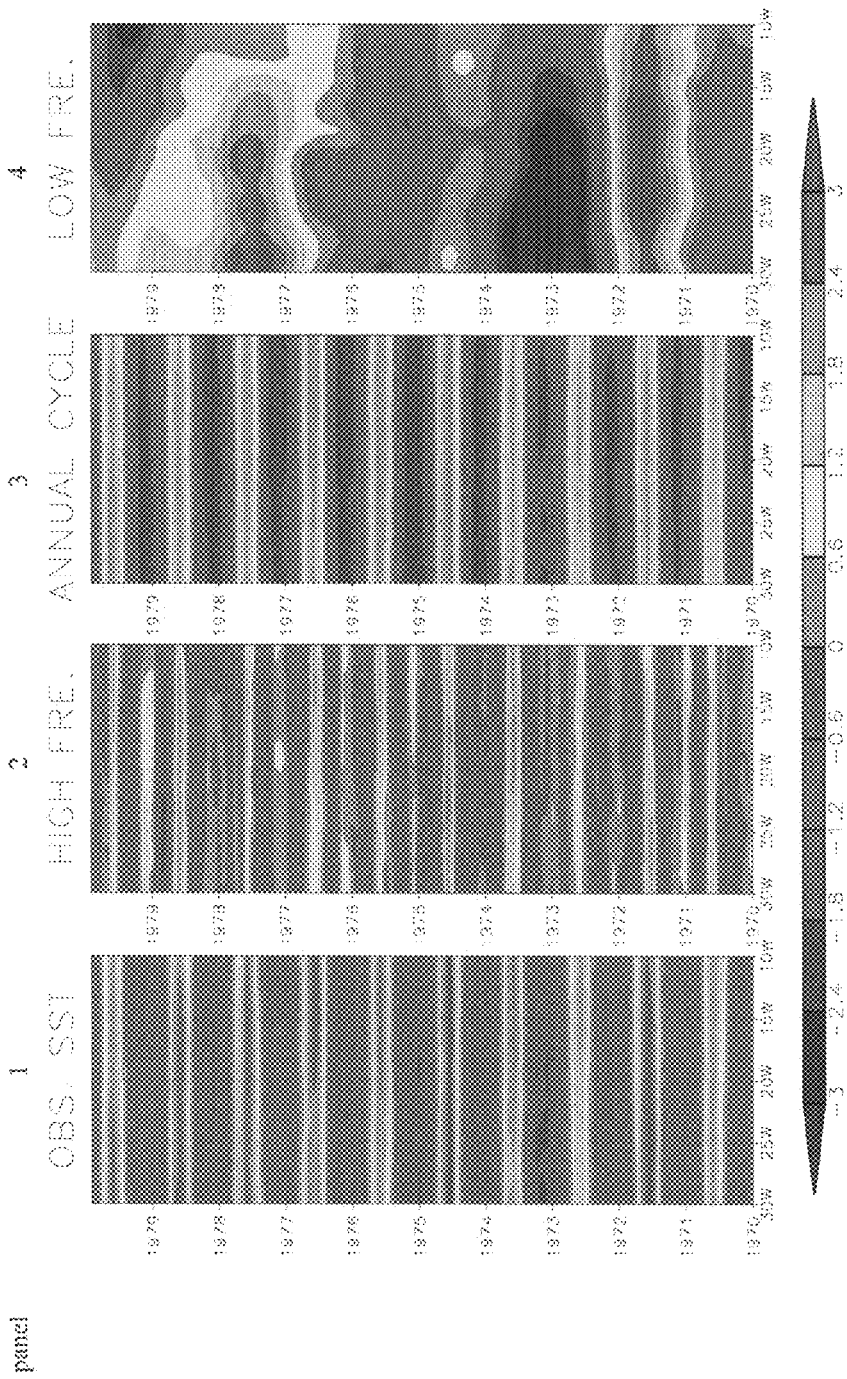
FIG. 4 shows the decomposition of the sea surface temperature (SST) from 30° W to 10° W along 60° N latitude using EEMD-based pseudo-BEMD.

FIG. 4 shows the decomposition of the sea surface temperature (SST) from 30° W to 10° W along 60° N latitude using EEMD-based pseudo-BEMD. Same as FIG. 3, panels 1-4 from the left to the right are the SST, its high frequency component, its MAC (ANNUAL CYCLE), and its low frequency component. Since EEMD eliminates largely the scale mixing problem and preserves physical uniqueness of the components, with EEMD replacing EMD, the coherent structures of the components emerge, as shown in FIG. 4. In this way, the pseudo-BEMD method can be applied to reveal the evolution of spatial structures of data.

It should be noted the "pseudo-BEMD" method is not limited to only one spatial dimension; rather, it can be applied to data of any number of spatial-temporal dimensions. Since the spatial structure is essentially determined by timescales of the variability of a physical quantity at each location and the decomposition is completely based on the characteristics of individual time series at each spatial location, there is no a priori assumption of spatial coherent structures of this physical quantity. When a coherent spatial structure emerges, it reflects better the physical processes that drive the evolution of the physical quantity on the timescale of each component. Therefore, we expect this method to have significant applications in spatial-temporal data analysis.

The EEMD is a spatial-temporally local filtering method dictated by dyadic filter windows while still keeping its adaptive nature, and therefore it can allocate variability of two dimensional data into appropriate components of certain timescales. Since spatial two dimensional data or images usually do not have preferred structure in a given direction, (otherwise, the two-dimensional data or images are degenerated to one-dimension data,) the data or images should be equally treated in any given orthogonal directions. Therefore, the one-dimensional decomposition such as in pseudo-BEMD is not enough; and decomposition must be performed in two orthogonal directions. Suppose now f(m,n) in equation (5) represents spatially two-dimensional data or an image f(x,y), after it is decomposed in one-direction, suppose y-direction, we obtain components $g_j(m,n)$ as expressed in equation (8), we further decompose each row of $g_j(m,n)$ using EEMD as described previously. The details are given as follows.

Figure 5:
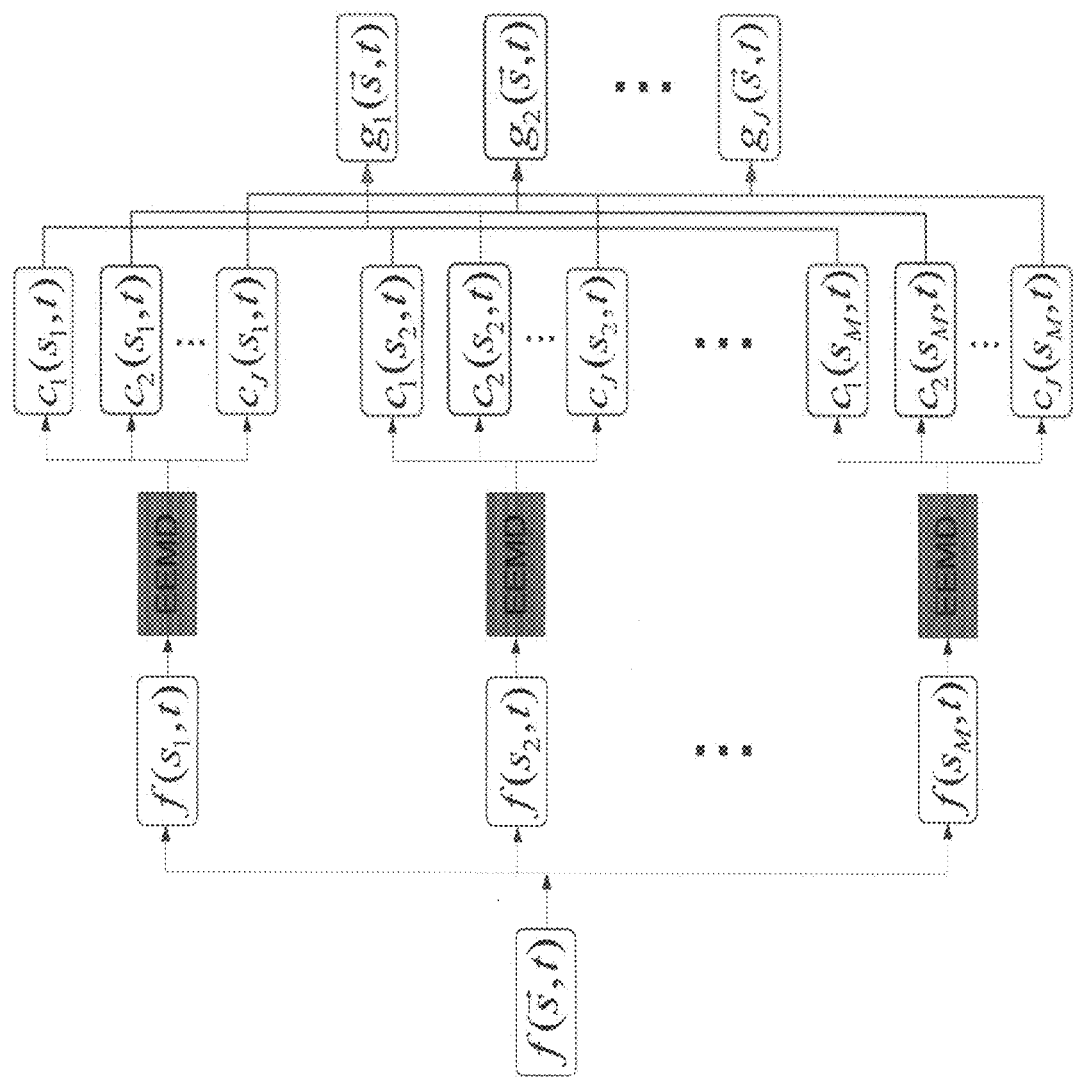
FIG. 5 shows the flow chart of Spatial-temporal multi-dimensional EMD according to one embodiment of the present invention.

FIG. 5 shows the flowchart of a method for processing and applying multi-dimensional Spatial-temporal physical data through EEMD according to one embodiment of the present invention. For multi-dimensional temporal-spatial data, EEMD is applied to time series of each spatial location to obtain IMF-like components of different time scales. All the ith IMF-like components of all the time series of all spatial locations are arranged to obtain ith temporal-spatial multi-dimensional IMF-like component.

According to FIG. 5, the method processes and applies multi-dimensional temporal-spatial data, in which the multi-dimensional temporal-spatial data corresponds to at least three directions. The method first receives time series of each spatial location $f(s_1,t) \sim f(s_M,t)$, and decomposes the time series $f(s_1,t) \sim f(s_M,t)$ to extract intrinsic mode functions components $C_1(S_1,t)$, $C_1(S_2,t)$, $C_1(S_M,t) \ldots C_J(S_M,t)$. Then, the intrinsic mode function components $C_1(S_1,t)$, $C_1(S_2,t)$, $C_1(S_M,t) \ldots C_J(S_M,t)$ with different spatial location $S_1$, $S_2 \ldots S_M$ are combined to get multi-dimensional temporal-spatial intrinsic mode functions $g_1(\vec{S},t)$, $g_2(\vec{S},t) \ldots g_J(\vec{S},t)$.

Figure 6:
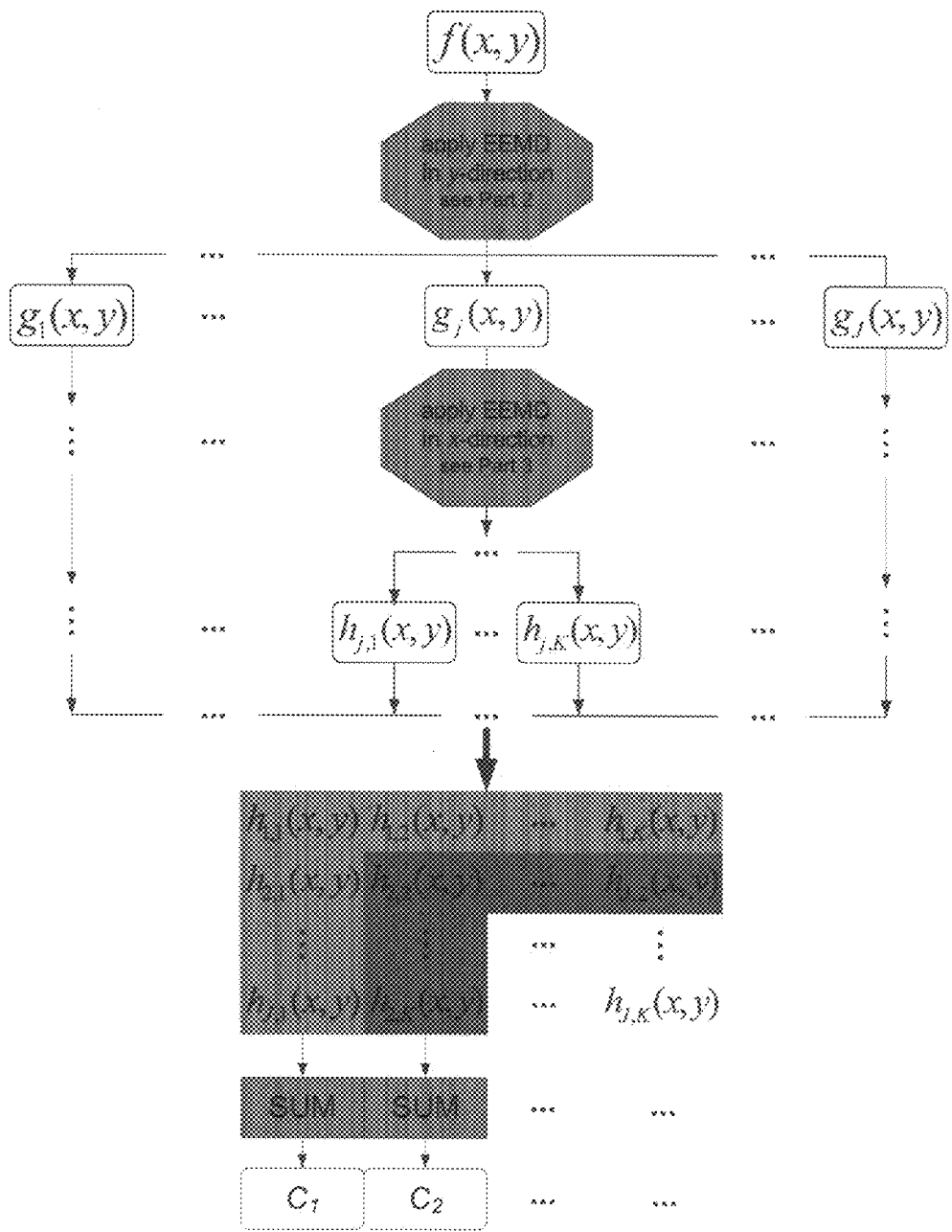
FIG. 6 shows the overview Spatial-temporal two-dimensional EMD according to one embodiment of the present invention.
Figure 7:
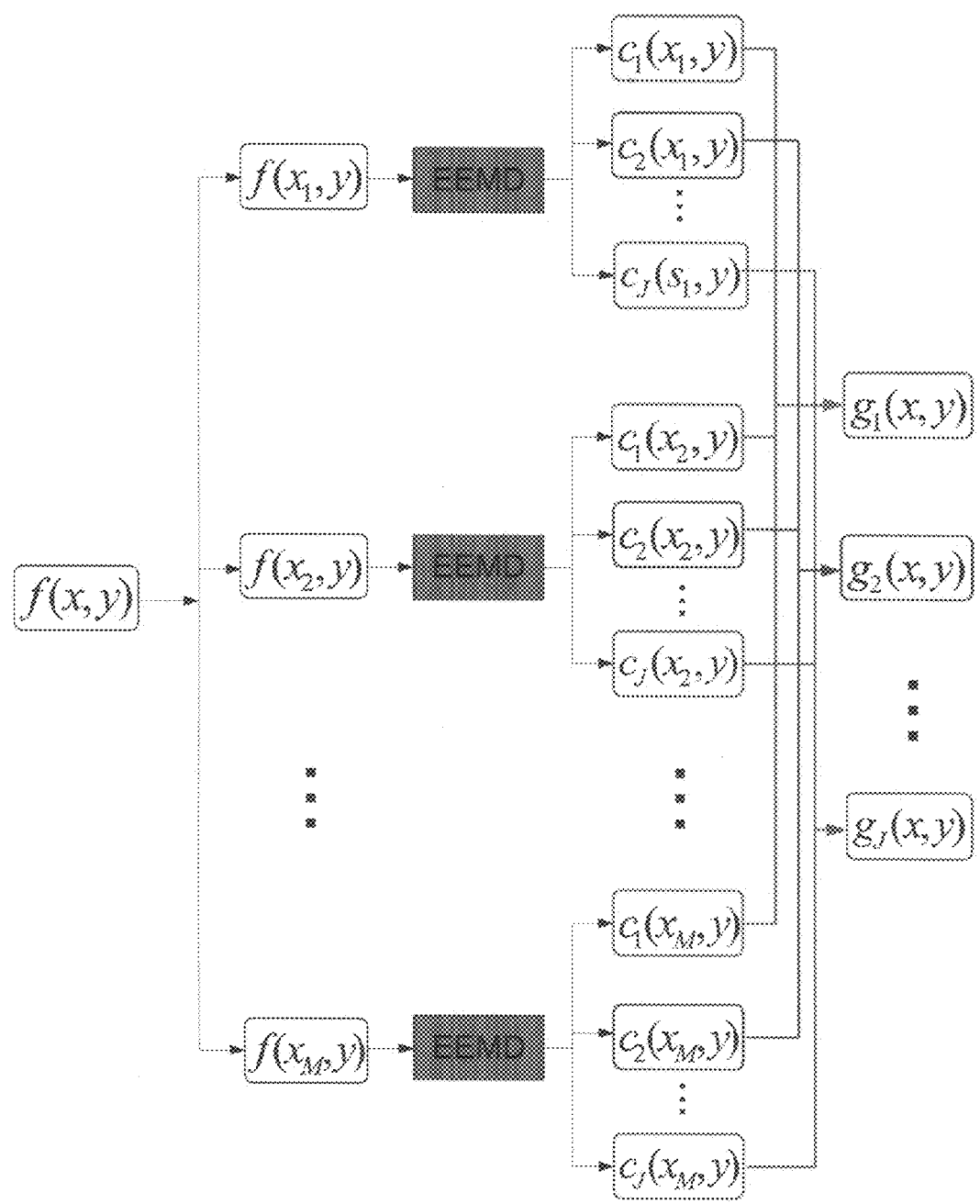
FIG. 7 shows the spatial-temporal two-dimensional EMD decomposition in the first direction according to one embodiment of the present invention.
Figure 8:
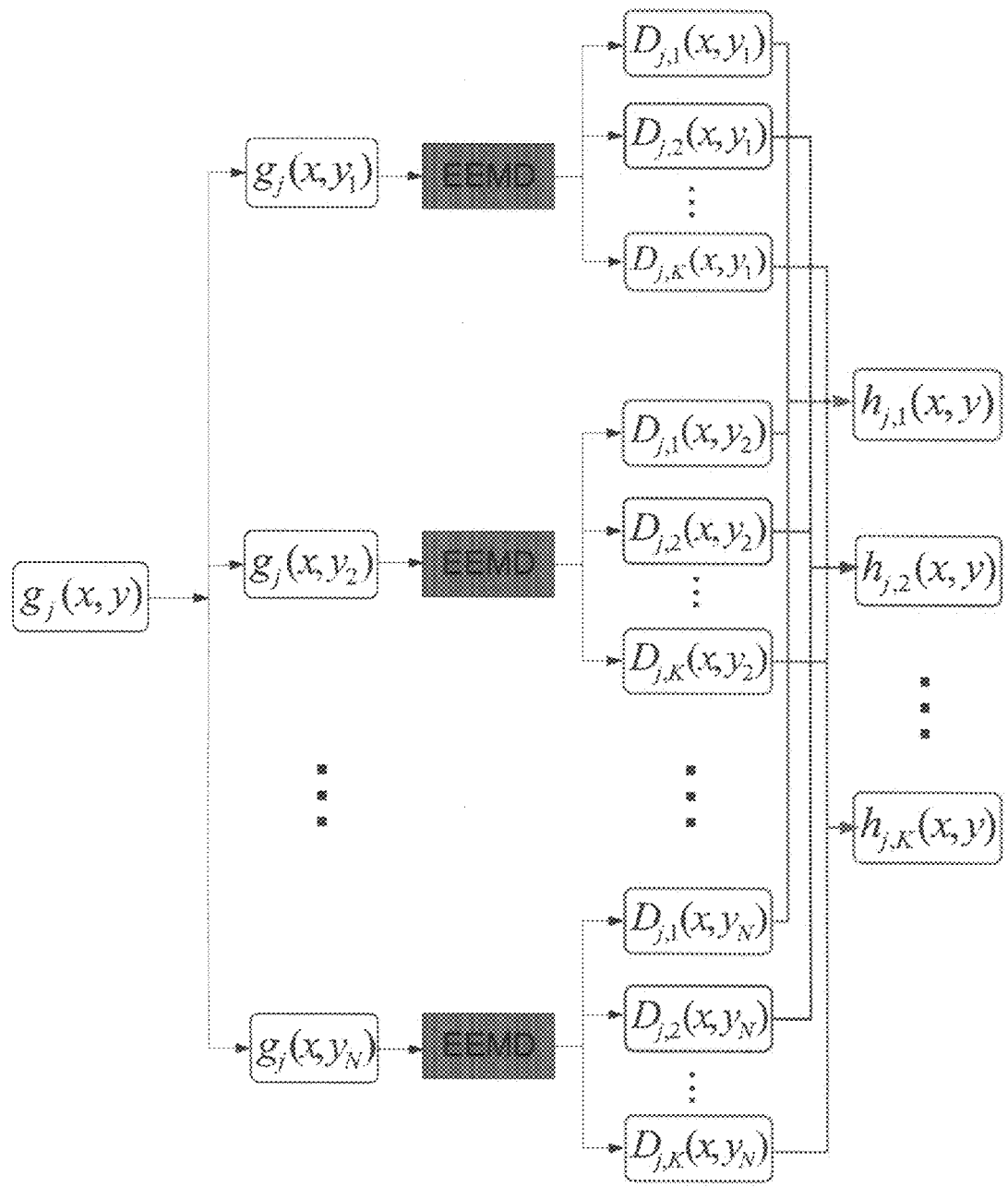
FIG. 8 shows the spatial-temporal two-dimensional EMD decomposition in the second direction according to one embodiment of the present invention.

FIG. 6, FIG. 7 and FIG. 8 show the flowchart for a method of processing and applying two-dimensional Spatial-temporal physical data through EEMD according to one embodiment of the present invention, in which FIG. 6 shows the overview, FIG. 7 shows decomposition in the first direction, and FIG. 8 shows decomposition in the second direction.

As shown in FIG. 6, the method for processing and applying physical data, such as two-dimensional spatial data or images f(x,y), adapts the same approach to the one used in temporal-spatial data decomposition to obtain the resulting two-dimensional IMF-like components $g_1(x,y) \sim g_J(x,y)$, in which we first consider the f(x,y) as a collection of one-dimensional series in x-direction along locations in y direction. Then, each of the resulting IMF-like components $g_1(x,y) \sim g_J(x,y)$ are taken as the new two-dimensional data for further decomposition, but the data is considered as a collection of one-dimensional series in the y-direction along locations in x-direction in this time. In this way, we obtain a collection of two-dimensional components $h_{j,1}(x,y) \sim h_{j,K}(x,y)$. These directly resulted components $h_{j,1}(x,y) \sim h_{j,K}(x,y)$ are further combined into a reduced set of final components $C_1, C_2 \ldots$ based on a minimal-scale combination strategy.

As shown in FIG. 7, the method for processing and applying two-dimensional physical data f(x,y), such as spatial data or images, first receives the two-dimensional physical data f(x,y) representative of the physical phenomenon, and decomposes the two-dimensional physical data f(x,y) in first direction to extract first intrinsic mode function components $C_1(X_1,y) \ldots C_J(X_M,y)$ via Ensemble Empirical Mode Decomposing, then combines the first intrinsic mode function components $C_1(X_1,y) \ldots C_J(X_M,y)$ to get $g_1(x,y) \sim g_J(x,y)$.

Next, as shown in FIG. 8 the method decomposes the combined components $g_j(x,y)$ in second direction to extract second intrinsic mode function components $D_{j,1}(x,y_1) \ldots D_{j,k}(x,y_N)$ via the Ensemble Empirical Mode Decomposing, and combines the second intrinsic mode function components $D_{j,1}(x,y_1) \ldots D_{j,k}(x,y_N)$ to get $h_{j,1}(x,y) \sim h_{j,K}(x,y)$.

The approach for two-dimensional spatial data can be extended to multi-dimensional data. EEMD is applied in the first dimension, then in the second direction, and then in the third direction, etc., using the almost identical procedure as for the two-dimensional spatial data. A similar minimal-scale combination strategy can be applied to combine all the directly resulted components into a small set of multi-dimensional final components.

Figure 9:
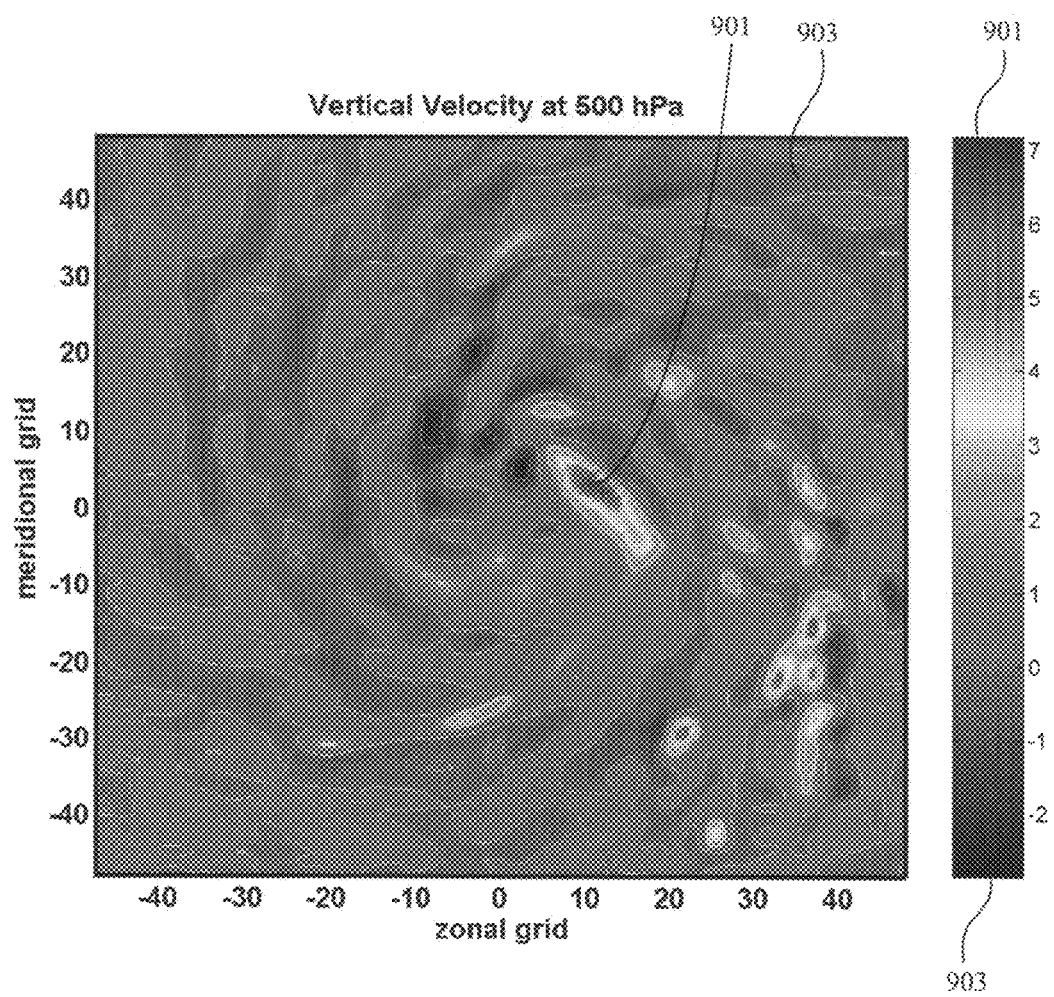
FIG. 9 shows the numerically simulated vertical velocity at 500 hPa level of Hurricane Rita of 2005 according to one embodiment of the present invention.

FIG. 9 shows the numerically simulated vertical velocity at 500 hPa level of Hurricane Rita of 2005 according to one embodiment of the present invention. The warm color 901 represents the upward motion and the cold color 903 represents downward motion. The unit is m/s. For convenience, we write the nth row of jth component $g_j(\sim,n)$ of f(m,n) and its EEMD decomposition as, $$g_j(\sim, n) = (c_{1,n,j} \quad c_{2,n,j} \quad \ldots \quad c_{M,n,j}), \quad (9)$$

and

-continued $$g_j(\sim, n) = \sum_{k=1}^{K} D_{j,k}(\sim, n) \quad (10)$$

$$= \sum_{k=1}^{K} (d_{1,n,j,k} \quad d_{2,n,j,k} \quad \ldots \quad d_{M,n,j,k}),$$

respectively. Similar to the pseudo-BEMD case, we rearrange the decomposition component as $$h_{j,k}(m, n) = \begin{pmatrix} d_{1,1,j,k} & d_{2,1,j,k} & \ldots & d_{M,1,j,k} \\ d_{1,2,j,k} & d_{2,2,j,k} & \ldots & d_{M,2,j,k} \\ \ldots & \ldots & \ldots & \ldots \\ d_{1,N,j,k} & d_{2,N,j,k} & \ldots & d_{M,N,j,k} \end{pmatrix} \quad (11)$$

The complete decomposition is $$f(m, n) = \sum_{k=1}^{K} \sum_{j=1}^{J} h_{j,k}(m, n) \quad (12)$$

Figure 10:
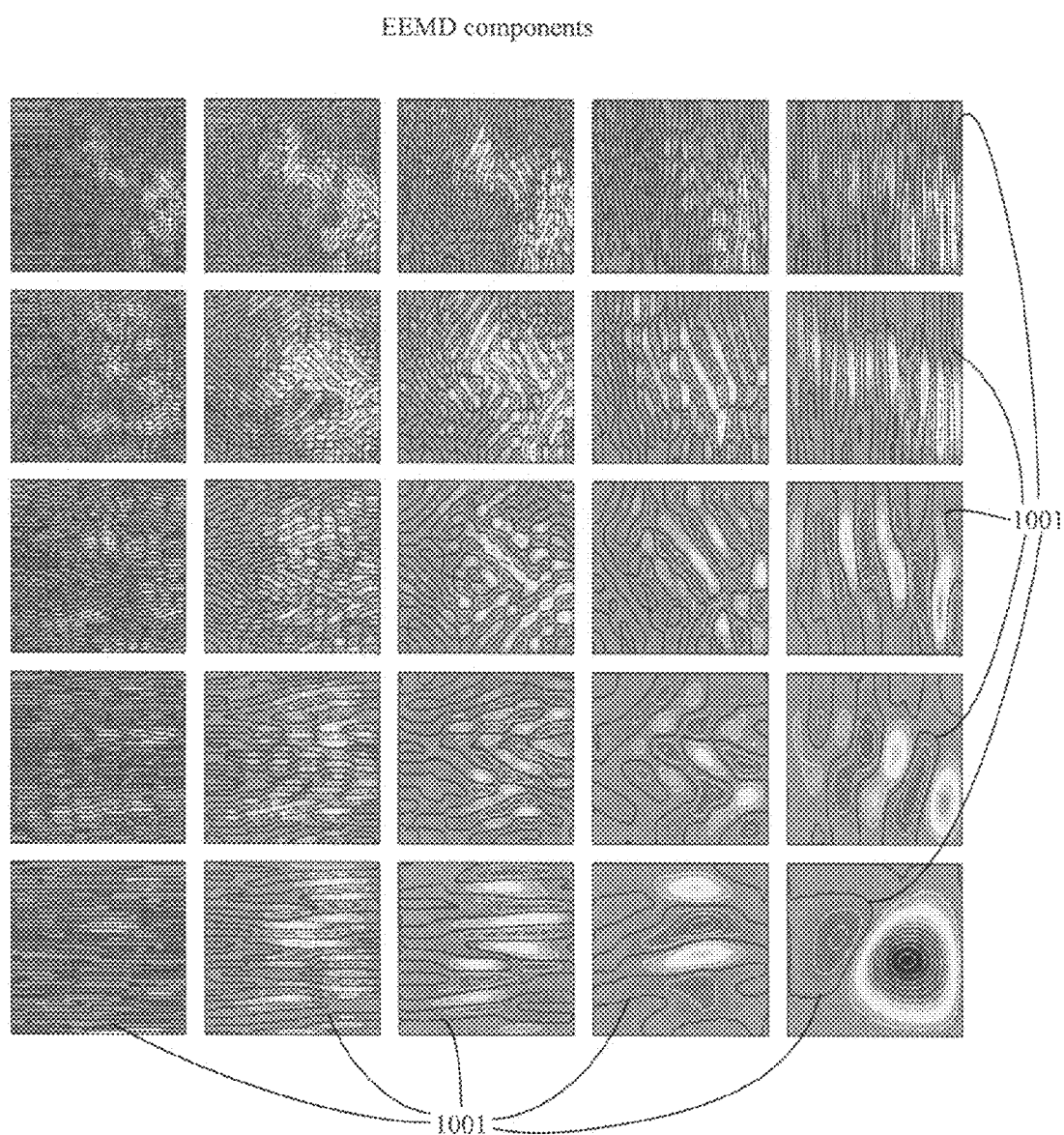
FIG. 10 shows the EEMD components of the vertical velocity at 500 hPa level of Hurricane Rita of 2005 according to one embodiment of the present invention.

An example of such a decomposition is given in FIG. 9 and FIG. 10, with FIG. 9 displaying the original data (with a size of horizontal and vertical grid points of 97 each) which is the numerically simulated vertical velocity at 500 hPa level (around the mid of the troposphere) of hurricane Andrew in 1992 according to one embodiment of the present invention, and FIG. 10 displaying its components.

FIG. 10 shows the EEMD components of the vertical velocity displayed in FIG. 9. In each panel, the color scales are different, the blue lines 1001 corresponding to zeros. The results shown in FIG. 10 do not provide important information about the convection structure of the hurricane Andrew. The structure of each component shows orientation (combination of different spatial scales in different directions), for example, the zero lines of $h_{1,5}$ are almost all vertically oriented while these of $h_{5,1}$ all horizontally oriented. This makes us wonder if such a BEMD in two orthogonal directions is useful to reveal important information of an image of a physical system.

Figure 11:
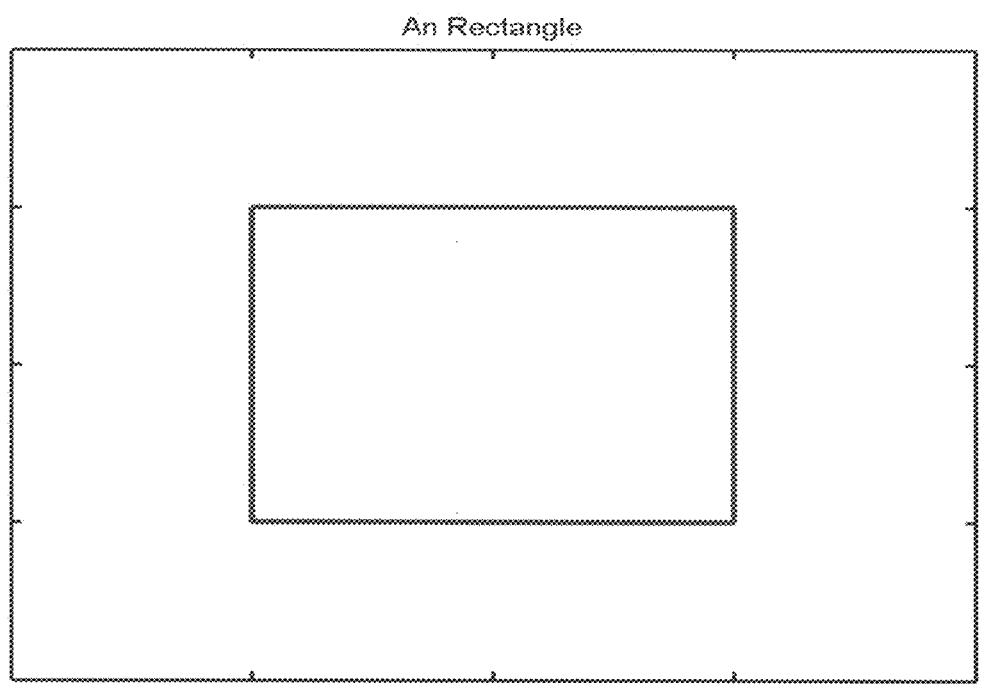
FIG. 11 shows a rectangle according to one embodiment of the present invention.

To proceed, consider what the most important capability of a two-dimensional decomposition method is. FIG. 11 shows a rectangle according to one embodiment of the present invention. Suppose we have a rectangle as displayed in FIG. 11. When it is decomposed using a two dimensional decomposition method, what is desired is that one component catches the whole rectangle. Clearly the rectangle has several spatial scales: the small spatial scale of line thickness, and the large spatial scales of the lengths of the different sides. When EEMD is applied to both horizontal and vertical directions, since EEMD is a dyadic filter, in principle, the decomposition results in components of which none of them catches the whole rectangle. However, one of these components that have horizontal scales of about line thickness and vertical scales of about the length of the vertical line catches the two vertical lines of the rectangle. Similarly, one of these components catches the two horizontal lines of the rectangle. The combination of these two components catches the whole rectangle. Clearly, the common feature of these two components is that their minimal scales are the line thickness, the minimal spatial scales of each of these two components.

With the above discussion in mind, our EEMD-based BEMD involves a new combination strategy: Among all the components derived from applying of EEMD in two orthogonal directions, the components that have approximately the same minimal scales are combined into one component.

The above statement seems to require the examination of the minimal scales of each component resulted from the decomposition. In reality, it is not! With the way the order of the decomposition using EEMD is carried out, such as the components displayed in FIG. 10, each row of components would have approximately the same horizontal scale and each column approximately the same vertical scale. Such a property can be easily verified.

Figure 12:
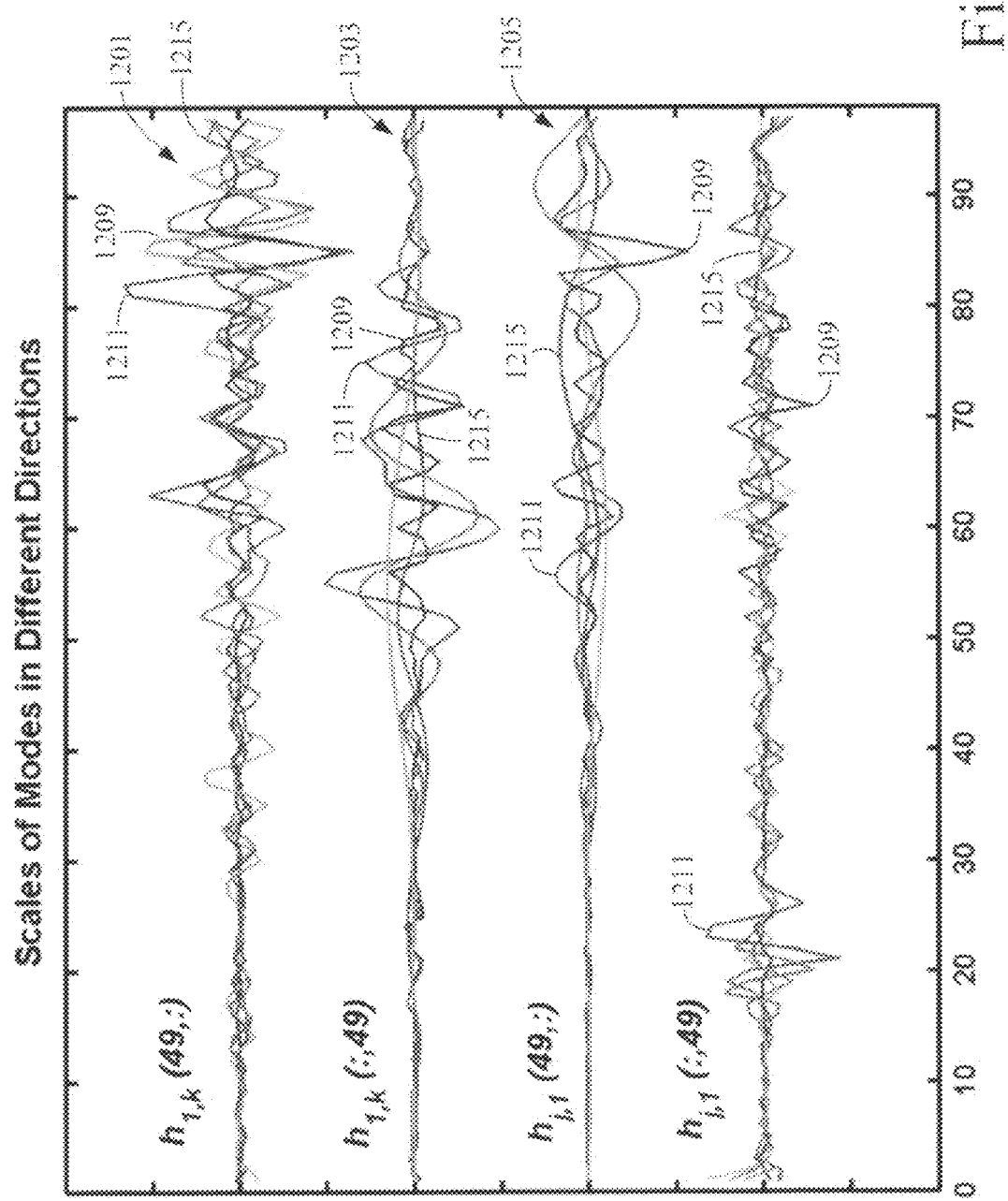
FIG. 12 shows the vertical velocity oscillations of the first row components and the first column components along the central vertical lines and horizontal lines of each row according to one embodiment of the present invention.

FIG. 12 shows the vertical velocity oscillations of the first row components and the first column components along the central vertical lines and horizontal lines of each row according to one embodiment of the present invention. The first group 1201 (also the second group 1203) (from the top) of the lines are the velocity oscillations of the first row of components (displayed in FIG. 10) along the middle horizontal (vertical) line of each component; and the third group 1205 (fourth) (from the top) of the lines are the velocity oscillations of the first column of components (displayed in FIG. 10) along the middle horizontal (vertical) line of each component. In the figure, the different color lines correspond to different panels, with blue lines 1209 corresponding to i or j equal to 1, red lines 1211 corresponding to 2; green lines corresponding to 3, and magenta lines 1215 corresponding to 4, and cyan lines 5. While the details of each line are different, the minimal spatial scales (in the horizontal direction) of the first row $h_{1,k}$ and the minimal spatial scales (in the vertical direction) of the first column $h_{j,1}$ of the components are approximately the same, although the vertical (horizontal) scales of the first row (column) increase as k(j) increases.

In light of the above results and discussions, the combination of modes can be very simple: The final ith component $C_i$ of the decomposition can be written as $$C_i = \sum_{k=i}^{K} h_{i,k} + \sum_{j=i+1}^{J} h_{j,i}, \quad (13)$$

which is displayed in table 1.

Table 1 shows the visual schematic of the combinations of components resulted from applying EEMD to data in two orthogonal directions for the case of J=K, as expressed by equation (11). The components listed in the cells with the same color and symbols (+,− * /) are summed to form a final mode. The final components are expressed in equation (11).

| $h_{1,1}$ (+) | $h_{1,2}$ (+) | (+) ... | $h_{1,K}$ (+) |
| $h_{2,1}$ (+) | $h_{1,2}$ (−) | ... (−) | $h_{2,K}$ (−) |
| ... (+) | ... (−) | ... (*) | ... (*) |
| $h_{K,1}$ (+) | $h_{K,2}$ (−) | ... (*) | $h_{K,K}$ (+) |

Figure 13:
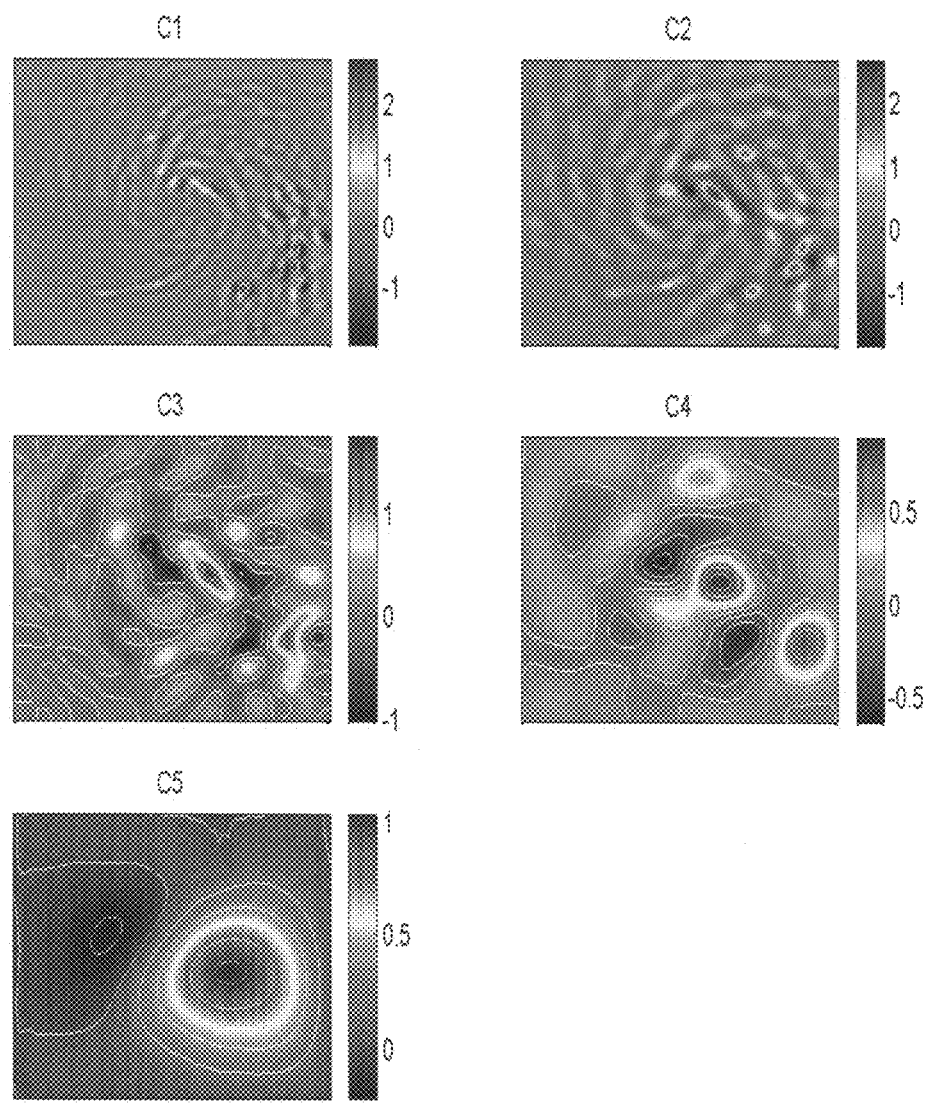
FIG. 13 shows the final components of the hurricane Andrew according to one embodiment of the present invention.

FIG. 13 shows the final components of hurricane Andrew according to one embodiment of the present invention. The decomposition reveals interesting features of hurricane Andrew, such as mass sucked in by the hurricane vortex, gravity waves and vortex Rossby waves. The first component C1 represents the finest structure that is not seen by directly viewing the original vertical velocity field; and the second components C2 catches the general impression of the original vertical velocity field. Both components C1 and C2 display the suck-in structure of the vortex, and are consistent with the sweeping rain bands (corresponding to the upward motion bands) of the hurricane. Indeed, the results are very similar to the regression of radar reflection signals of Andrew. Component C3 is associated with gravity waves, and components C4 and C5 (the remainder) are associated with large scale waves (Rossby waves) that are not seen in the original wind field. These waves are polarized along the hurricane track, indicating that these waves may be important in determine the track of the hurricane, and can potentially provide some prediction skills for hurricane track.

It should be pointed out that the results displayed in FIG. 13 are not sensitive to either the north-south axis (the vertical direction displayed in previous figures) or the east-west axis (the horizontal direction). The vortex-type structure of the hurricane and its final structure essentially imply the decomposition is independent of the selection of the orthogonal reference frame for the decomposition as long as same grid distance with respect to the orthogonal reference frame is selected.

The decomposition scheme proposed here could be extended to data of any multi-dimension such as data of a solid with different density or other measurable properties given as $$I=f(x_1, x_2, \ldots, x_n) \tag{14}$$

Figure 14:
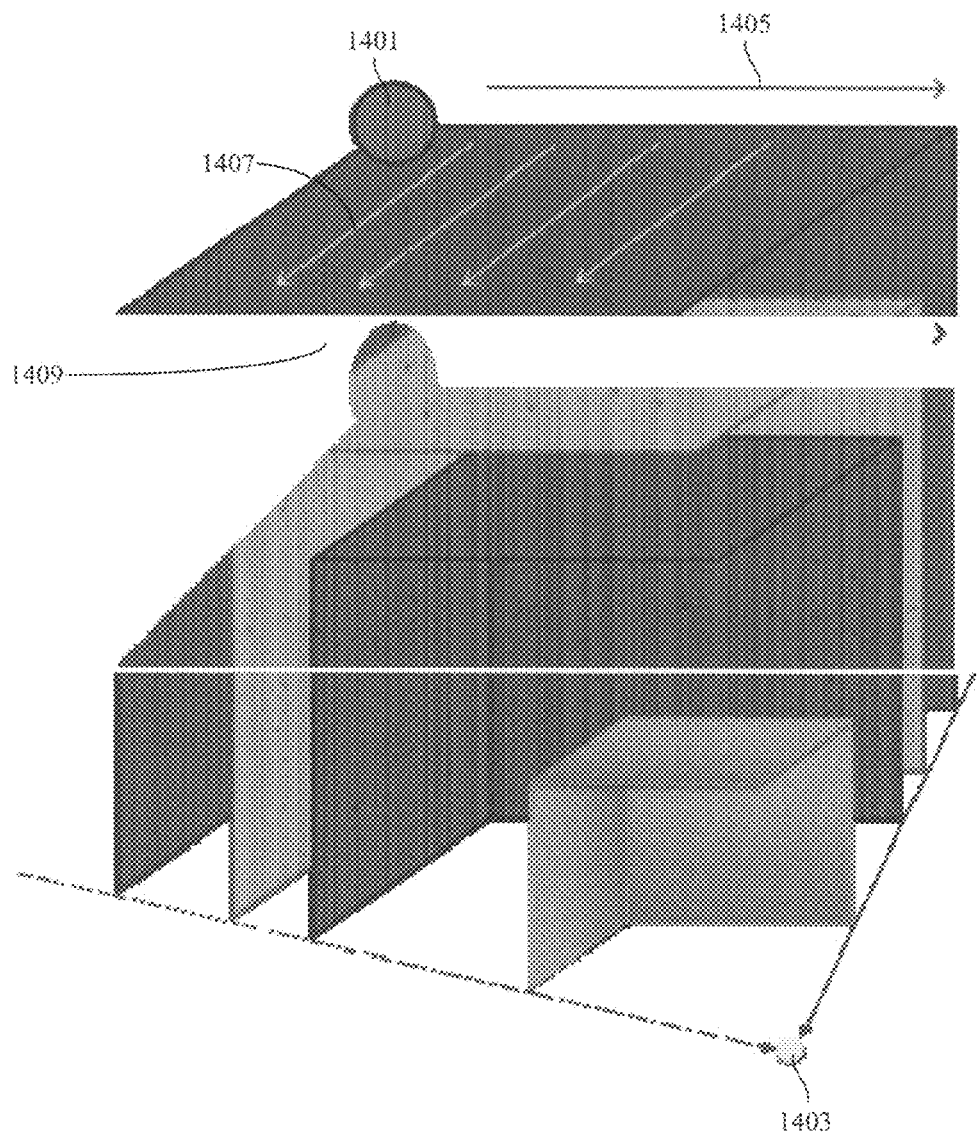
FIG. 14 shows the schematics of decomposition and reconstruction of multi-dimension EEMD according to one embodiment of the present invention.

In which the subscription, n, indicates the number of dimensions. The procedure is identical to the one described above: The decomposition starts with the first dimension, and proceeds to the second and third till all the dimensions are exhausted. The decomposition is still implemented by slicing. FIG. 14 shows the schematics of decomposition and reconstruction of multi-dimension EEMD according to one embodiment of the present invention. In FIG. 14, the large red point 1401 and small yellow point 1403 denote the original data (3-D) and final IMFs, respectively. The red arrows 1405, yellow arrows 1407, and magenta arrows 1409 denote the first, second, and third decompose direction, respectively. The minimum scale combinations are taken along the three planes with the same color. The schematic of reconstruction for a 3-dimensional data is given in FIG. 14. It should be noted that there is no difficult in implementing this scheme, for the data analysis is consisted essentially of 1-dimensional Ensemble EMD.

Figure 15:
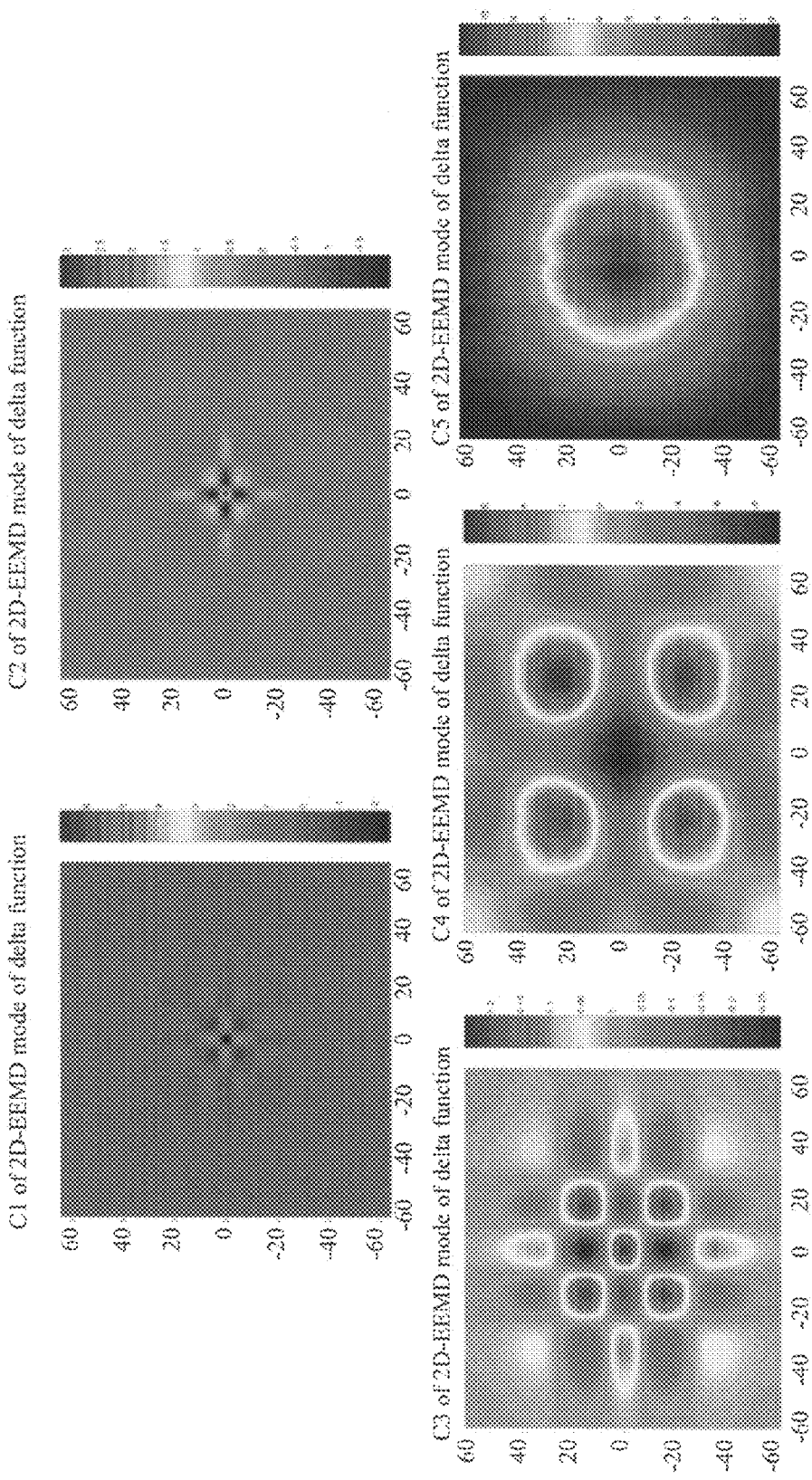
FIG. 15 shows the decomposition of a point source [$\delta(x,y)$ function] using 2D EMD according to one embodiment of the present invention.

In the following, we will present some examples of the application of EEMD-based BEMD to various types of data. The advantages of the method will be demonstrated through these examples. FIG. 15 shows the decomposition of a point source [δ(x,y) function] using 2D EMD according to one embodiment of the present invention.

In this case, a delta function δ(x,y) is specified. The function has values zero at all grids except at the origin, where the value is specified as 10. As shown in FIG. 15, given in number of data points in x and y directions, the decomposition is not circularly symmetric with respect to the origin, and is similar to the decomposition of the same function using 2D wavelet decomposition. This orientation-sensitive result seems to contradict our assertion that our new BEMD is orientation independent. However, the reason for this orientation-sensitive result is because the delta function does not have any extrema excepted at the origin, which, in some sense, should not be considered a true two-dimensional field. If we consider the delta function as an average of many cases of noise perturbed delta functions, i.e., $$\delta(x, y) = \lim_{N \to \infty} \frac{1}{N} [\delta(x, y) + w_n(x, y)], \tag{14}$$

where n=1, . . . , N, and $w_i(x,y)$ is one realization of two-dimensional Gaussian white noise of amplitude of the same order of the delta function, then by decomposing $$\delta(x,u)+w_n(x,y) \tag{15}$$

Using the EEMD-based BEMD and carrying out the average action to corresponding components (suppose all the components of the same rank) dictated by the dyadic filter property of EEMD, the resulted components show the circular structure. In this way, the apparent contradiction can be resolved.

There is a major improvement over the 2D wavelet decomposition. When the delta function like signal is moved around, the decomposition using our method will give almost identical results except that all the components will be centered at the non-zero location of the delta function like signal. When 2D wavelet decomposition is applied, the components will have significantly different structures when the valued location of the delta function like signal moves, a result of the lack of the locality and the adaptivity of the wavelet tools. This result can be easily verified.

In decomposition of a noise contaminated 2D signal, a two dimensional synthetic data is decomposed using our approach to illustrated the capability of our new method in de-noising. The synthetic data is $$\sin\left(\frac{\pi x}{24}\right)\sin\left(\frac{\pi y}{24}\right) + w(x, y),$$

where w(x,y) is uniformly distributed noise with a value from 0 to 1.

Figure 16:
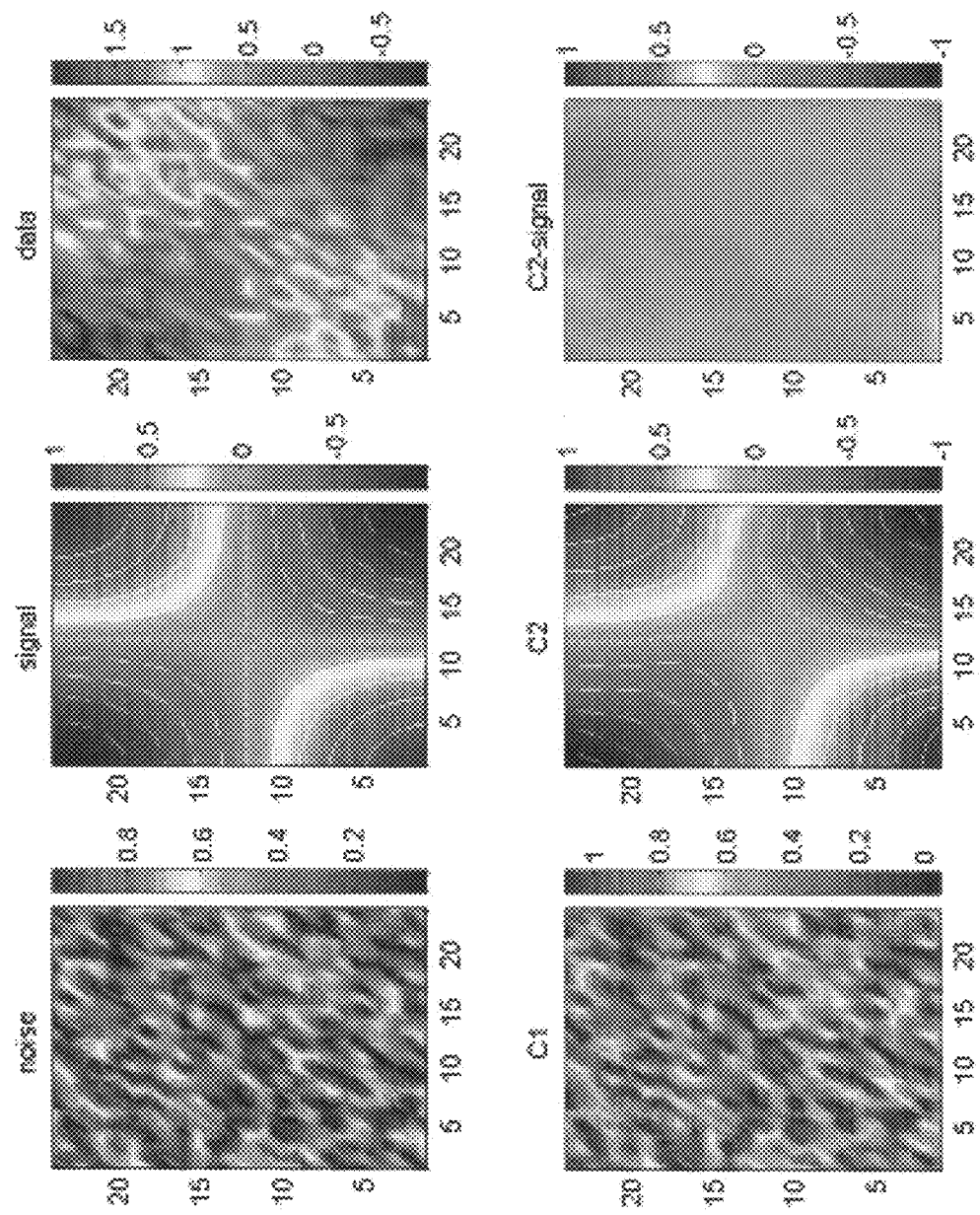
FIG. 16 shows the decomposition of a noise contaminated two-dimensional signal according to one embodiment of the present invention.

FIG. 16 shows the decomposition of a noise contaminated two-dimensional signal according to one embodiment of the present invention. Upper left panel: the noise N; upper middle panel: the specified signal (S); upper right panel: the synthetic noise contaminated 2D signal (S+N); lower left panel: the sum of the decomposed small scale components (extracted noise, N'); lower middle panel: the sum of the decomposed large scale components (extracted signal, S'); and lower right panel: the difference between true signal (S) and the extracted signal (S').

The original signal and the decomposition are shown in FIG. 16. The extracted noise field is very similar to the specified noise filed, with a correlation coefficient over 0.95. Since the specified noise contains large-scale structure and the extracted noise does not, the extracted signal is not exactly the specified signal. However, this is not a drawback of our approach, since the large scale signal contained noise is not distinguishable from the large scale signals. In general, the decomposition recovers very well the specified signal. In this sense, this method can be used to extracted 2D noise in various applications.

The third example is the decomposition of famous image Lena. Lena has been a popular image in the image processing fields, and has served as the bench-mark image for testing various methods. Our decomposition is displayed in FIG. 17, and its Matlab code (a scripting code) is provided at the end of the description of the embodiments.

Figure 17:
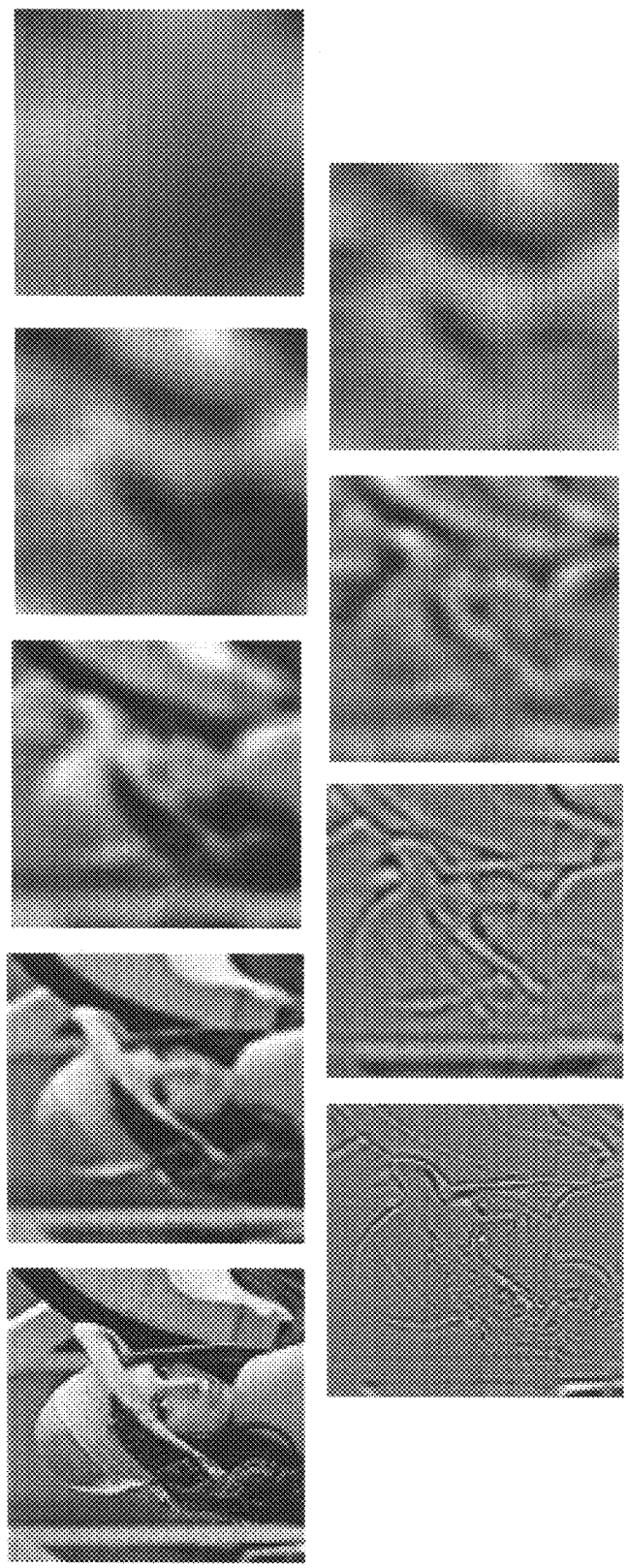
FIG. 17 shows the decomposition of Lena (128×128 pixels) according to one embodiment of the present invention.

FIG. 17 shows the decomposition of Lena (128×128 pixels) according to one embodiment of the present invention. The upper panels are the original picture and the remainder after n components are extracted, n=1, 2, 3, 4. The lower panels are components 1 to 4, from finer to large scale.

Careful examination of the decomposition will lead to the conclusion that our decomposition is superior to those using the other methods, including some genuine 2D EMD method. The most important improvement is the elimination of scale mixing that happens in other 2D methods while still keeping the adaptivity. The first component is simply a line drawing of Lena, with sharp edges of the lines. The second component provides a blurred version of Lena. The combination of these two gives back the sharp version of the original image.

Another major improvement is the elimination of the artificial structure in the large scale. When scale mixing happened, it is a common occurrence that a relatively high positive value at a certain location in one component accompanying with a relatively high negative value at the same location in its neighboring components. Such paired structures are artificial. In early decomposition using other 2D EMD methods, e.g., in Linderhed (2005), such paired structure is extremely obvious in the large scale components. However, with the elimination of the scale mixing using our technique, the artificial structure is gone.

Figure 18:
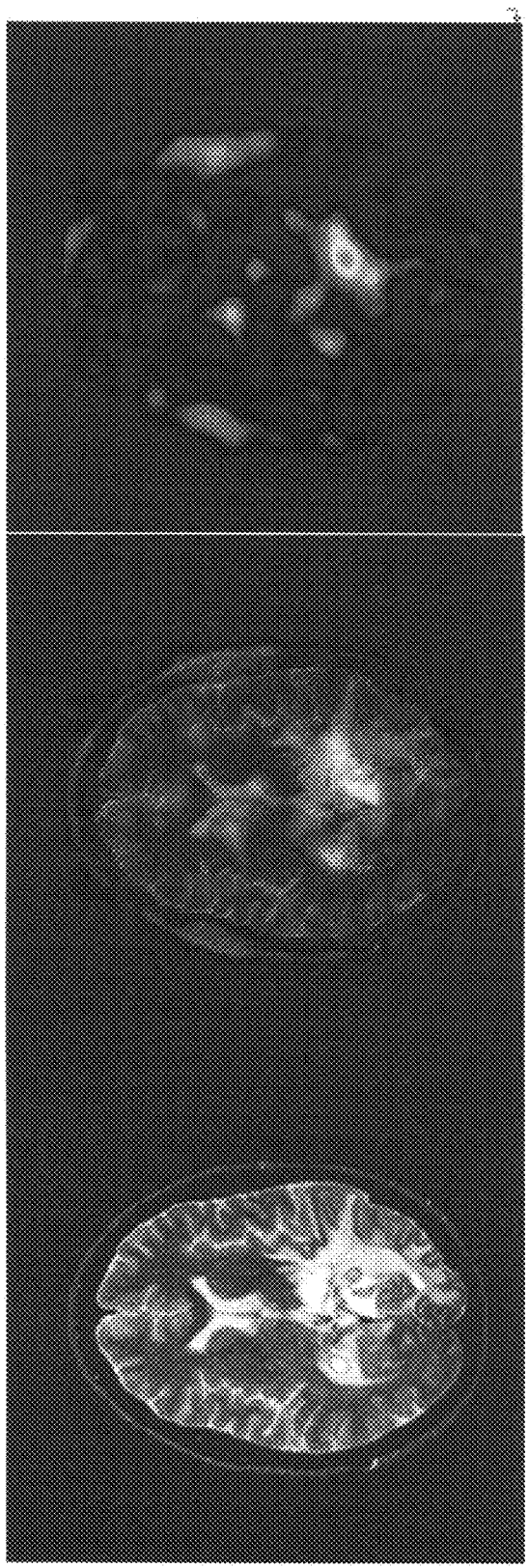
FIG. 18 shows the medical application as described according to one embodiment of the present invention.

FIG. 18 shows the medical application as described according to one embodiment of the present invention. The image for this example is extracted from the Website of Harvard Medical School for Radiology at http://www.med.harvard.edu/AANLIB/cases/case1/mr1-tl4/029.html. The images given above show the T2-weighted MR (left), Thallium SPECT (right), and their overlay (central). The red-and-yellow bright-hot area in the Thallium SPECT represents the active tumor lesion. Note the Thallium SPECT in the right figure does not cover all the abnormality area in this presentation.

Clinically, the Harvard Website describes this case as: "A 51 year old woman sought medical attention because of gradually increasing right hemiparesis (weakness) and hemianopia (visual loss). At craniotomy (August 1990), left parietal anaplastic astrocytoma was found. A right frontal lesion was biopsied in August 1994. Recurrent tumor was suspected on the basis of the imaging, and was confirmed pathologically."

Figure 19:
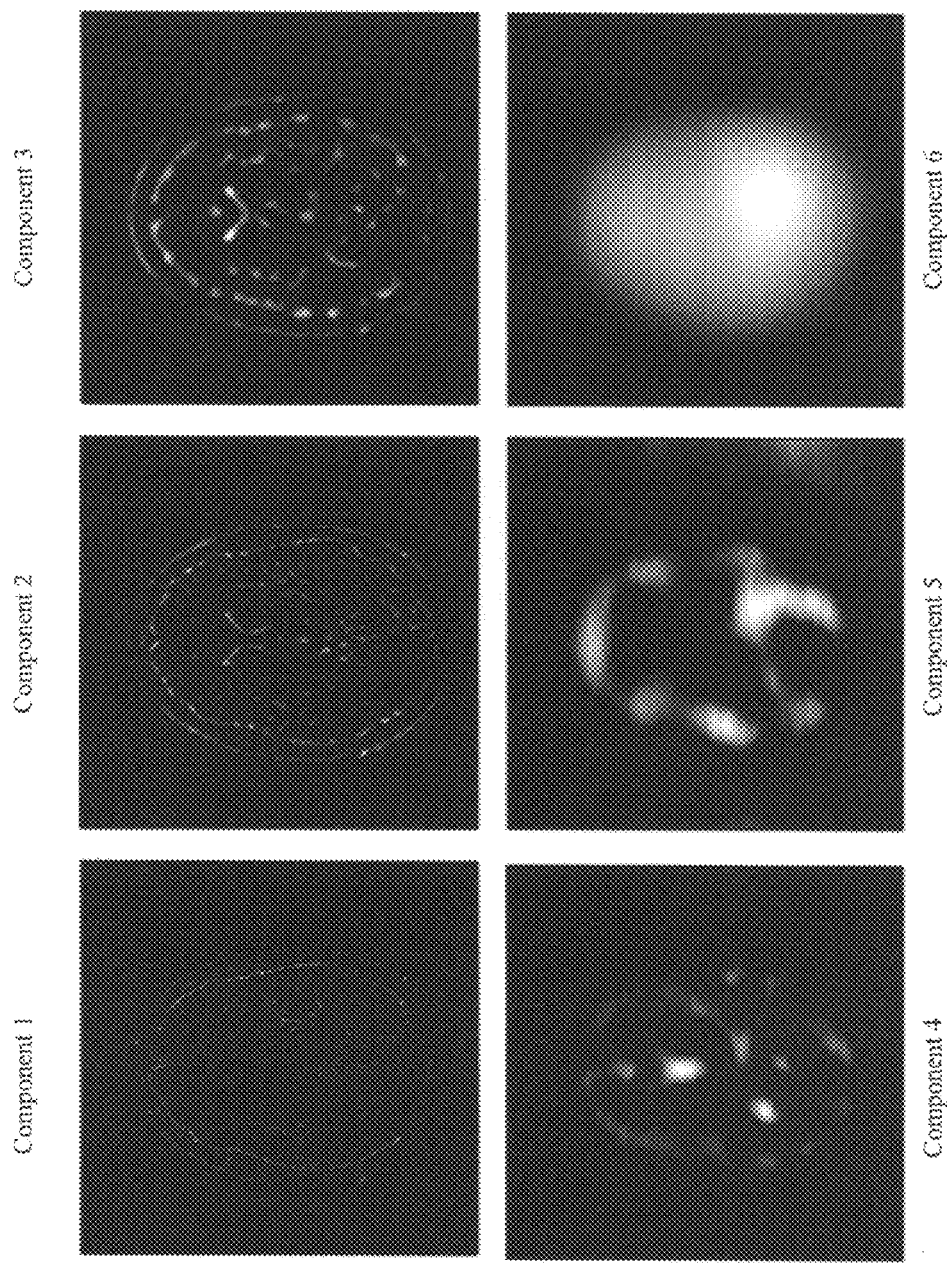
FIG. 19 shows the results of the decomposition of the image according to one embodiment of the present invention.

The image shown in FIG. 18 is analyzed with the 2D EEMD. FIG. 19 shows the results of the decomposition of the MR image according to one embodiment of the present invention. The upper panels are the n components for n=1, 2, 3. The lower panels are components 4 to 6. This sequence represents image textural from finer to large scale.

In this present representation, the original image is decomposed into 6 components each representing a separate scale range. The first component represents the smallest scale or the finest textural, while the last one gives only the largest scale of the overall mean trend in intensity of the image. The various combinations of the individual components could be used to emphasize different textural and intensity variations of the image. As an example, the combination of the components 1 and 5 is used in the following images. This image accentuates the finest texture (component 1) and the intensity variation that still retained some structure of the original image (component 5).

Figure 20:
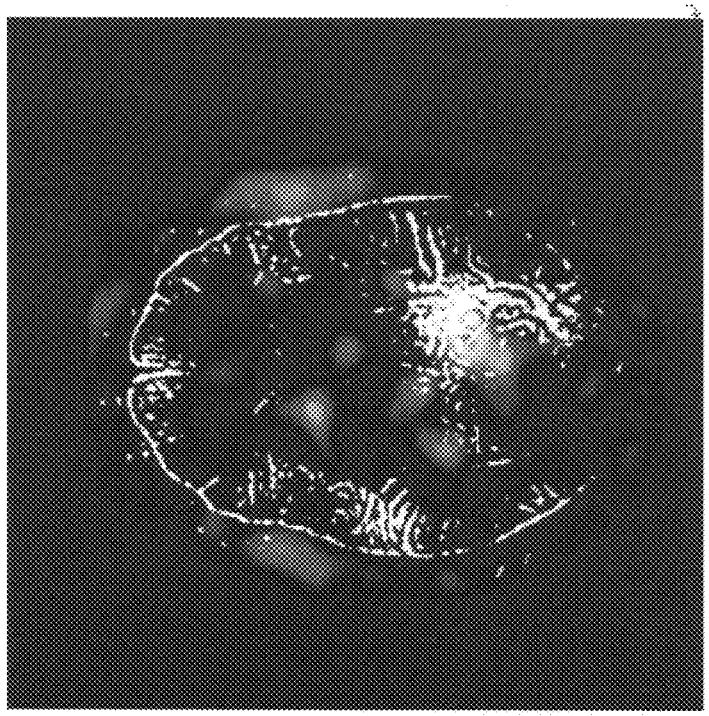
FIG. 20 shows the recombination from the decompositions of the MR image superposed on the Thallium SPECT image according to one embodiment of the present invention.
Figure 20:
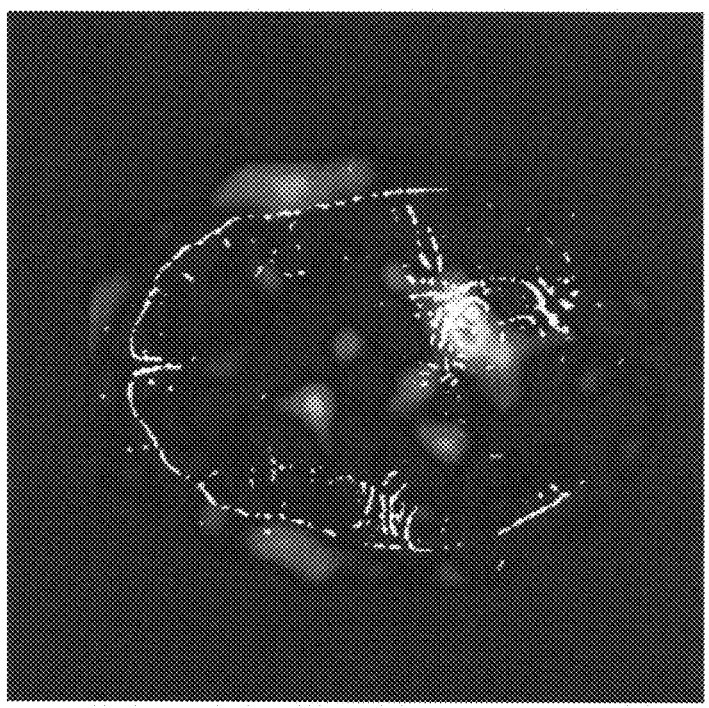

FIG. 20 shows the recombination from the decompositions of the MR image superposed on the Thallium SPECT image according to one embodiment of the present invention. These two panels are all from the combination of components 1 and 5, but with different contour selections: the left panel representing the contour starting from 1 to 30; the right one from 1 to 40. Note the concentrated contour areas near the tumor lesion.

From FIG. 20, we can see that either contour presentation accentuates the region of the tumor lesion influence. Though the exact clinical implications need additional studies, the ability to accentuate selected area is potentially useful. In this case, the contour intensive area actually covers the whole abnormal region. For example, the contoured area may not represent the active tumor lesion, but the edematous brain tissue; the contours could enable us to quantify the lesion and the degree of severity of the tumor. Other combinations are possible, of course. The present example gives only an indication for potential future applications of the decomposed results.

In this embodiment, we develop a 2D EMD method based on EEMD. The method is based on a completely different thinking from those serving as the foundations for genuine 2D EMD methods. Our method bypasses major obstacles and difficulties in defining extrema, in obtaining membrane fitting. Significant improvements include the elimination of scale mixing and thereby the artificial structures in decomposition.

The EEMD-based BEMD can be easily extended to spatially three- or more-dimensional fields without any barrier. Such extension would not be feasible for the genuine two-dimensional approach, for the method to fit the spatially scatted data in higher dimension would involve membrane of higher manifold would soon lost direct geometrical meaning and the computations, even if possible, would be prohibitively expensive. The present slice approach could still be clearly and systematically implemented. Furthermore, the equivalence of higher order saddle points, ridges and valleys would not be a problem in the present approach. With the EEMD added, the problems of mode mixing would not be a problem. To overcome all these problems in the traditional approach would be an insurmountable task.

Matlab program for decomposition of image "Lena" is provided to illustrate how the newly proposed method works. It should be noted here that the reason we display the Matlab program instead of the programs using some other major computational programming languages, such as C, C++, Fortran, etc., is that Matlab is more a scripting computational language that can illustrate the idea in more concise and clear fashion. The patent, however, should not limited to Matlab program, but include the multi-dimensional EMD methods implemented using any computational language.

The program modules including the following:

```
1. driver: lenadecomp.m
clear;
clf;
% loading image data
load lena2.dat;
% image data size in one-dimension
N=111;
% specify ensemble number
nesb=100;
% decomposition in the first dimension and arrange the output
for i=1:N,
    temp=lena2(i,:);
    rslt=eemd(temp,0.2,nesb,4);
    for j=1:N,
        for k=1:5,
            rsltd1(i,j,k)=rslt(j,k+1);
        end
    end
end
% decomposition in the second direction
for k=1:5,
    for j=1:N,
        temp2=rsltd1(:,j,k);
```

```
            rslt=eemd(temp2,0.2,nesb,4);
            for i=1:N,
                for kk=1:5,
                    rslt2d(i,j,k,kk)=rslt(i,kk+1);
                end
            end
        end
    end
end
% combine modes
for i=1:N
    for j=1:N,
        for m=1:5,
            rsltf(i,j,m)=0;
            for k=m:5,
                rsltf(i,j,m)=rsltf(i,j,m)+rslt2d(i,j,k,m);
                rsltf(i,j,m)=rsltf(i,j,m)+rslt2d(i,j,m,k);
            end
            rsltf(i,j,m)=rsltf(i,j,m)−rslt2d(i,j,m,m);
        end
    end
end
2. function 1: eemd.m
% Y: Inputted data;
% Nstd: ratio of the standard deviation of the added noise and that of Y;
% NE: Ensemble member being used
% TNM: total number of modes (not including the trend)
%
function allmode=eemd(Y,Nstd,NE,TNM)
% find data length
xsize=length(Y);
dd=1:1:xsize,
% Normaliz data
Ystd=std(Y);
Y=Y/Ystd;
% Initialize saved data
TNM2=TNM+2;
for kk=1:1:TNM2,
    for ii=1:1:xsize,
        allmode (ii,kk)=0.0;
    end
end
for iii=1:1:NE,
% adding noise
    for i=1:xsize,
        temp=randn(1,1)*Nstd;
        X1(i)=Y(i)+temp;
        X2(i)=Y(i)−temp;
    end
% sifting X1
    xorigin = X1;
    xend = xorigin;
% save the initial data into the first column
    for jj=1:1:xsize,
        mode(jj,1) = xorigin(jj);
    end
    nmode = 1;
    while nmode <= TNM,
        xstart = xend;
        iter = 1;
        while iter<=10,
            [spmax, spmin, flag]=extrema(xstart);
            upper= spline(spmax(:,1),spmax(:,2),dd);
            lower= spline(spmin(:,1),spmin(:,2),dd);
            mean_ul = (upper + lower)/2;
            xstart = xstart − mean_ul;
            iter = iter +1;
        end
        xend = xend − xstart;
            nmode=nmode+1;
            % save a mode
            for jj=1:1:xsize,
                mode(jj,nmode) = xstart(jj);
            end
    end
    % save the trend
    for jj=1:1:xsize,
        mode(jj,nmode+1)=xend(jj);
    end
    % add mode to the sum of modes from earlier ensemble members
        allmode=allmode+mode;
%%%%==================================================
% sifting X2
    xorigin = X2;
    xend = xorigin;
    % save the initial data into the first column
    for jj=1:1:xsize,
        mode(jj,1) = xorigin(jj);
    end
    nmode = 1;
    while nmode <= TNM,
        xstart = xend;
        iter = 1;
        while iter<=10,
            [spmax, spmin, flag]=extrema(xstart);
            upper= spline(spmax(:,1),spmax(:,2),dd);
            lower= spline(spmin(:,1),spmin(:,2),dd);
            mean_ul = (upper + lower)/2;
            xstart = xstart − mean_ul;
            iter = iter +1;
        end
        xend = xend − xstart;
            nmode=nmode+1;
            % save a mode
            for jj=1:1:xsize,
                mode(jj,nmode) = xstart(jj);
            end
    end
    % save the trend
    for jj=1:1:xsize,
        mode(jj,nmode+1)=xend(jj);
    end
    % add mode to the sum of modes from earlier ensemble members
        allmode=allmode+mode;
end
% ensemble average
allmode=allmode/NE/2;
% Rescale mode to origional unit.
allmode=allmode*Ystd;
3. function: extrema.m
% This is function to find all the extrema
function [spmax, spmin, flag]= extrema(in_data)
flag=1;
dsize=length(in_data);
% find all the mazimums
spmax(1,1) = 1;
spmax(1,2) = in_data(1);
jj=2;
kk=2;
while jj<dsize,
    if ( in_data(jj−1)<=in_data(jj) & in_data(jj)>=in_data(jj+1) )
        spmax(kk,1) = jj;
        spmax(kk,2) = in_data (jj);
        kk = kk+1;
    end
    jj=jj+1;
end
spmax(kk,1)=dsize;
spmax(kk,2)=in_data(dsize);
if kk>=4
    slope1=(spmax(2,2)−spmax(3,2))/(spmax(2,1)−spmax(3,1));
    tmp1=slope1*(spmax(1,1)−spmax(2,1))+spmax(2,2);
    if tmp1>spmax(1,2)
        spmax(1,2)=tmp1;
    end
    slope2=(spmax(kk−1,2)−spmax(kk−2,2))/
           (spmax(kk−1,1)−spmax(kk−2,1));
    tmp2=slope2*(spmax(kk,1)−spmax(kk−1,1))+spmax(kk−1,2);
    if tmp2>spmax(kk,2)
        spmax(kk,2)=tmp2;
    end
else
    flag=−1;
end
msize=size(in_data);
dsize=max(msize);
xsize=dsize/3;
xsize2=2*xsize;
spmin(1,1) = 1;
```

-continued

```
spmin(1,2) = in_data(1);
jj=2;
kk=2;
while jj<dsize,
    if ( in_data(jj-1)>=in_data(jj) & in_data(jj)<=in_data(jj+1))
        spmin(kk,1) = jj;
        spmin(kk,2) = in_data (jj);
        kk = kk+1;
    end
    jj=jj+1;
end
spmin(kk,1)=dsize;
spmin(kk,2)=in_data(dsize);
if kk>=4
    slope1=(spmin(2,2)-spmin(3,2))/(spmin(2,1)-spmin(3,1));
    tmp1=slope1*(spmin(1,1)-spmin(2,1))+spmin(2,2);
    if tmp1<spmin(1,2)
        spmin(1,2)=tmp1;
    end
    slope2=(spmin(kk-1,2)-spmin(kk-2,2))/
        (spmin(kk-1,1)-spmin(kk-2,1));
    tmp2=slope2*(spmin(kk,1)-spmin(kk-1,1))+spmin(kk-1,2);
    if tmp2<spmin(kk,2)
        spmin(kk,2)=tmp2;
    end
else
    flag=-1;
end
    flag=1;
```

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer implemented method for processing and applying two-dimensional physical data and for displaying human visible images comprising information associated with the two-dimensional physical data, the method comprising:
    receiving the two-dimensional physical data representative of the physical phenomenon;
    decomposing, performed by a processor, the two-dimensional physical data in first direction to extract first intrinsic mode function components;
    combining the first intrinsic mode function components;
    decomposing the combined first intrinsic mode function components in second direction to extract second intrinsic mode function components;
    obtaining at least one decomposition component according to the first intrinsic mode function components and the second intrinsic mode function components; and
    combining the decomposition component; and
    displaying the human visible images according to the combined decomposition component.

2. The computer implemented method for processing and applying two-dimensional physical data and for analyzing human visible images comprising information associated with the two-dimensional physical data as claimed in claim 1, wherein decomposing the two-dimensional physical data comprising:
    adding one kind of white noise series to the physical data;
    decomposing the physical data with the added white noise series into intrinsic mode functions; and
    obtaining mean values of corresponding intrinsic mode functions to get the first intrinsic mode function components.

3. The computer implemented method for processing and applying two-dimensional physical data and for analyzing human visible images comprising information associated with the two-dimensional physical data as claimed in claim 1, wherein the first direction and the second direction are orthogonal.

4. The computer implemented method for processing and applying two-dimensional physical data and for analyzing human visible images comprising information associated with the two-dimensional physical data as claimed in claim 1, wherein the second intrinsic mode function components with approximately same scales are combined.

5. The computer implemented method for processing and applying two-dimensional physical data and for analyzing human visible images comprising information associated with the two-dimensional physical data as claimed in claim 4, wherein the scales are spatial scales.

6. The computer implemented method for processing and applying two-dimensional physical data and for analyzing human visible images comprising information associated with the two-dimensional physical data as claimed in claim 4, wherein the scale is corresponding to wave length.

7. The computer implemented method for processing and applying two-dimensional physical data and for analyzing human visible images comprising information associated with the two-dimensional physical data as claimed in claim 4, wherein the scale is the thickness, width, length, or height of a real material.

8. The computer implemented method for processing and applying two-dimensional physical data and for analyzing human visible images comprising information associated with the two-dimensional physical data as claimed in claim 1, further comprising displaying images composed of the combined second intrinsic mode function components.

9. A computer implemented method for processing and applying multi-dimensional temporal-spatial data and for displaying human visible images comprising information associated with the multi-dimensional temporal-spatial data, the method comprising:
    receiving time series of a spatial location of the multi-dimensional temporal-spatial data;
    decomposing, performed by a processor, the time series to extract intrinsic mode functions components in x-direction along locations in y direction;
    combining the intrinsic mode function components to get multi-dimensional temporal-spatial intrinsic mode functions, wherein the intrinsic mode function components with approximately same scales are combined;
    taking the multi-dimensional temporal-spatial intrinsic mode functions as new two-dimensional data for a further decomposition, wherein the new two-dimensional data is considered as a collection of one-dimensional series in the y-direction along locations in x-direction in this time; and
    displaying the human visible images according to a result of the further decomposition.

10. The computer implemented method for processing and applying multi-dimensional temporal-spatial data and for analyzing human visible images comprising information associated with the multi-dimensional temporal-spatial data as claimed in claim 9, wherein the decomposing comprising:
    adding one kind of white noise series to the time series;
    decomposing the time series with the added white noise series into intrinsic mode functions; and
    obtaining a mean value of corresponding intrinsic mode functions to get the intrinsic mode functions components.

11. The computer implemented method for processing and applying multi-dimensional temporal-spatial data and for analyzing human visible images comprising information associated with the multi-dimensional temporal-spatial data as claimed in claim 9, wherein the intrinsic mode function components with approximately same scales are combined.

12. The computer implemented method for processing and applying two-dimensional physical data and for analyzing human visible images comprising information associated with the multi-dimensional temporal-spatial data as claimed in claim 11, wherein the scales are time scales.

13. A computer system for processing and applying physical data and for displaying human visible images comprising information associated with the physical data, the system comprising a memory storing computer executable instructions for:
  receiving the physical data representative of physical phenomenon;
  decomposing, performed by a processor, the physical data in first direction to extract first intrinsic mode function components;
  combining the first intrinsic mode function components
  decomposing the combined first intrinsic mode function components in second direction to extract second intrinsic mode function components;
  obtaining at least one decomposition component according to the first intrinsic mode function components and the second intrinsic mode function components; and
  combining the decomposition component; and
  displaying the human visible images according to the combined decomposition component.

14. The computer system for processing and applying physical data and for analyzing human visible images comprising information associated with the physical data as claimed in claim 13, wherein the decomposing the physical data comprising:
  adding one kind of white noise series to the physical data;
  decomposing the physical data with the added white noise series into intrinsic mode functions; and
  obtaining mean values of corresponding intrinsic mode functions to get the first intrinsic mode function components.

15. The computer system for processing and applying physical data and for analyzing human visible images comprising information associated with the physical data as claimed in claim 13, wherein the first direction and the second direction are orthogonal.

16. The computer system for processing and applying physical data and for analyzing human visible images comprising information associated with the physical data as claimed in claim 13, wherein the second intrinsic mode function components with approximately same scales are combined.

17. The computer system for processing and applying physical data and for analyzing human visible images comprising information associated with the physical data as claimed in claim 16, wherein the scale are spatial scale.

18. The computer system for processing and applying physical data and for analyzing human visible images comprising information associated with the physical data as claimed in claim 16, wherein the scale is wave length.

19. The computer system for processing and applying physical data and for analyzing human visible images comprising information associated with the physical data as claimed in claim 16, wherein the scale is thickness, width, length, or height of a real material.

20. A computer implemented method for processing and applying two-dimensional physical data and for displaying human visible images comprising information associated with the two-dimensional physical data, the method comprising:
  receiving the two-dimensional physical data representative of the physical phenomenon;
  decomposing, performed by a processor, the two-dimensional physical data in first direction to extract first intrinsic mode function components;
  combining the first intrinsic mode function components;
  decomposing the combined first intrinsic mode function components in second direction to extract second intrinsic mode function components;
  obtaining at least one decomposition component according to the first intrinsic mode function components and the second intrinsic mode function components; and
  combining the decomposition component, wherein the decomposition component hj,k (m,n) is:

$$h_{j,k}(m, n) = \begin{pmatrix} d_{1,1,j,k} & d_{2,1,j,k} & \ldots & d_{M,1,j,k} \\ d_{1,2,j,k} & d_{2,2,j,k} & \ldots & d_{M,2,j,k} \\ \ldots & \ldots & \ldots & \ldots \\ d_{1,N,j,k} & d_{2,N,j,k} & \ldots & d_{M,N,j,k} \end{pmatrix};$$

and
  displaying the human visible images according to the combined decomposition component.

* * * * *